(12) United States Patent
Lee

(10) Patent No.: US 12,056,430 B2
(45) Date of Patent: Aug. 6, 2024

(54) METHODS OF ROUTING CLOCK TREES, INTEGRATED CIRCUITS AND METHODS OF DESIGNING INTEGRATED CIRCUITS

(71) Applicant: SAMSUNG ELECTRONICS CO., LTD., Suwon-si (KR)

(72) Inventor: Bonghyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 680 days.

(21) Appl. No.: 17/238,874

(22) Filed: Apr. 23, 2021

(65) Prior Publication Data

US 2022/0129612 A1 Apr. 28, 2022

(30) Foreign Application Priority Data

Oct. 27, 2020 (KR) .......................... 10-2020-0140285

(51) Int. Cl.
*G06F 30/396* (2020.01)
*H01L 23/528* (2006.01)
*G06F 117/04* (2020.01)

(52) U.S. Cl.
CPC ........ *G06F 30/396* (2020.01); *H01L 23/5286* (2013.01); *G06F 2117/04* (2020.01)

(58) Field of Classification Search
CPC .. G06F 30/396; G06F 2117/04; G06F 30/394; G06F 1/06; G06F 1/3237; H01L 23/5286; H03K 3/027; Y02D 10/00
See application file for complete search history.

(56) References Cited

U.S. PATENT DOCUMENTS

| | | | |
|---|---|---|---|
| 7,943,436 B2 | 5/2011 | McElvain | |
| 8,286,118 B2 | 10/2012 | McElvain | |
| 8,966,425 B1* | 2/2015 | Eisenstadt | G06F 30/394 716/120 |
| 9,009,645 B2 | 4/2015 | Cao et al. | |
| 9,135,375 B1* | 9/2015 | Sood | G06F 30/327 |
| 9,275,175 B2* | 3/2016 | Agarwal | G06F 30/30 |
| 10,157,254 B2 | 12/2018 | Yang et al. | |
| 10,282,506 B1* | 5/2019 | Meyer | G06F 1/10 |
| 10,380,288 B2* | 8/2019 | Zhang | G06F 30/394 |
| 10,963,617 B1* | 3/2021 | Chapman | G06F 30/20 |

(Continued)

FOREIGN PATENT DOCUMENTS

| | | |
|---|---|---|
| JP | 3599017 B2 | 12/2004 |
| JP | 2006261458 A | 9/2006 |
| KR | 101185797 B1 | 10/2012 |

*Primary Examiner* — Nha T Nguyen
(74) *Attorney, Agent, or Firm* — Myers Bigel, P.A.

(57) ABSTRACT

A method of routing a clock tree including a plurality of clock nets of an integrated circuit, where each of the plurality of clock nets includes at least one clock repeater, includes determining a level of a clock net of the plurality of clock nets based on a number of clock gating cells that a clock signal passes through until the clock net receives the clock signal from a clock source and routing a plurality of conductive lines in each of the plurality of clock nets by applying different routing rules to clock nets having different levels based on the determined level. Each of the plurality of clock nets is configured to transfer the clock signal to a plurality of synchronous elements or another clock net. The plurality of synchronous elements operate in synchronization with the clock signal and are included in the integrated circuit.

20 Claims, 22 Drawing Sheets

(56) References Cited

U.S. PATENT DOCUMENTS

| | | | |
|---|---|---|---|
| 11,022,998 B2* | 6/2021 | Ringe | G06F 1/10 |
| 2011/0302540 A1 | 12/2011 | Kwon et al. | |
| 2012/0176157 A1* | 7/2012 | Peng | G06F 30/394 |
| | | | 716/108 |
| 2014/0096101 A1* | 4/2014 | Kitaura | G11C 29/1201 |
| | | | 716/126 |
| 2014/0289690 A1* | 9/2014 | Chopra | G06F 30/396 |
| | | | 716/113 |
| 2014/0289694 A1* | 9/2014 | Ma | G06F 30/3312 |
| | | | 716/129 |
| 2017/0083654 A1* | 3/2017 | Chuang | G06F 30/398 |
| 2019/0294203 A1* | 9/2019 | Arp | G06F 30/394 |
| 2020/0135637 A1* | 4/2020 | Peng | H01L 21/76877 |

\* cited by examiner

INCREASE A ROUTING SPACE BETWEEN ADJACENT CONDUCTIVE LINES FROM AMONG THE PLURALITY OF CONDUCTIVE LINES AS THE LEVEL DECREASES — S210

INCREASE A ROUTING SPACE BETWEEN ADJACENT CONDUCTIVE LINES FROM AMONG THE PLURALITY OF CONDUCTIVE LINES AS THE LEVEL DECREASES — S210

INCREASE THE ROUTING SPACE IN A CLOCK NET HAVING A SAME LEVEL FROM AMONG THE PLURALITY OF CLOCK NETS AS THE DEGREE OF THE METAL LAYER INCREASES — S230

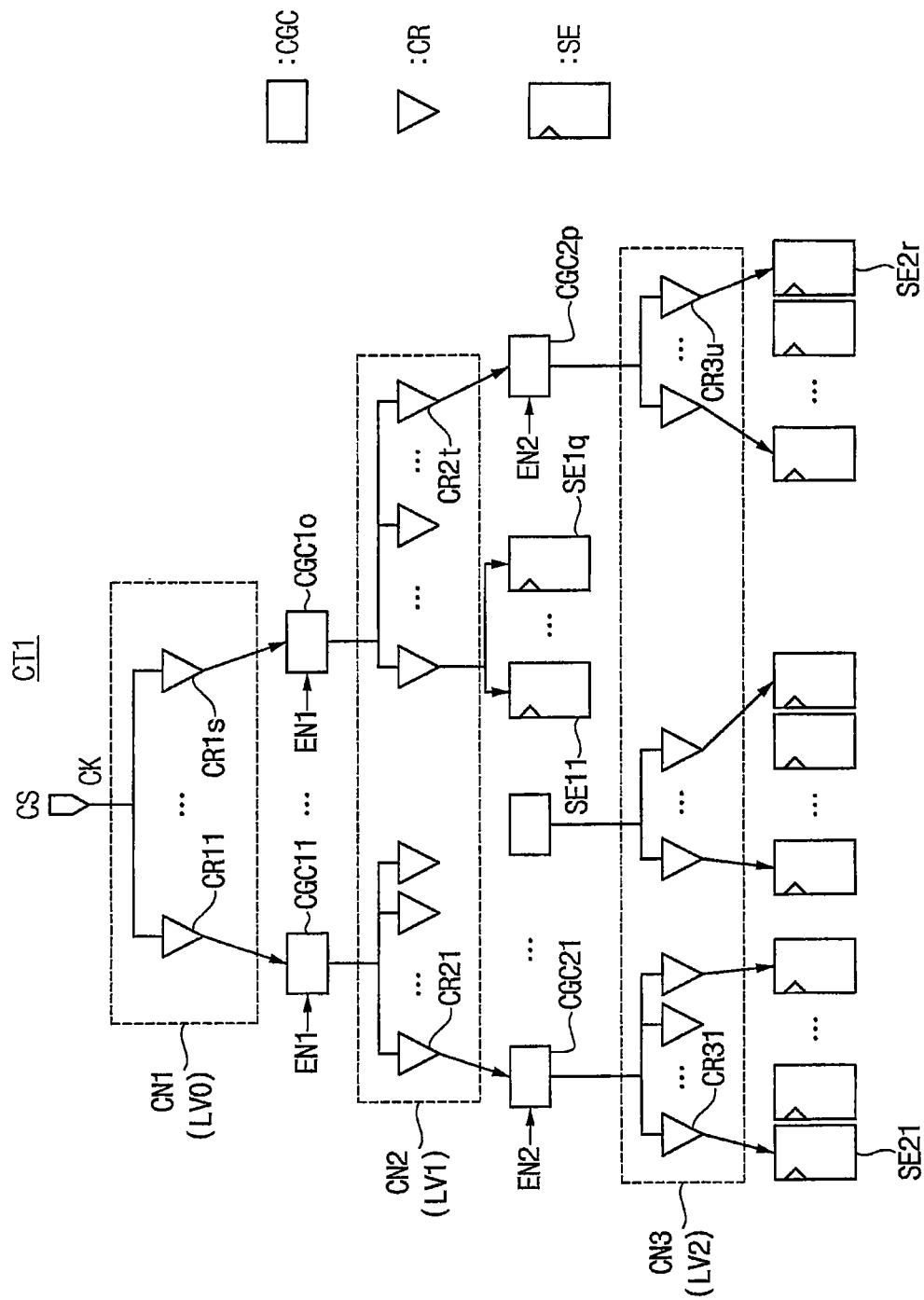

FIG. 9A

|  | LEVEL0 | ... | LEVELF | ... | LEVELJ |
|---|---|---|---|---|---|
| CSR | 3S | ... | 2S | ... | 1S |

FIG. 9B

| | METAL LAYER | LEVEL0 | ... | LEVELF | ... | LEVELJ |
|---|---|---|---|---|---|---|
| | METAL_N | 3S | ... | 3S | ... | 2S |
| | ... | ... | ... | ... | ... | ... |
| CSR | METAL_M | 3S | ... | 2S | ... | 1S |
| | ... | ... | ... | ... | ... | ... |
| | METAL_1 | 2S | ... | 1S | ... | 1S |

F-F'

G-G'

METHODS OF ROUTING CLOCK TREES, INTEGRATED CIRCUITS AND METHODS OF DESIGNING INTEGRATED CIRCUITS

CROSS-REFERENCE TO RELATED APPLICATION

This U.S. non-provisional application claims priority under 35 USC § 119 to Korean Patent Application No. 10-2020-0140285, filed on Oct. 27, 2020, in the Korean Intellectual Property Office (KIPO), the disclosure of which is incorporated by reference herein in its entirety.

BACKGROUND

1. Technical Field

Example embodiments of the present disclosure relate generally to semiconductor integrated circuits, and, more particularly, to methods of routing clock trees included in integrated circuits, integrated circuits, and methods of designing integrated circuits.

2. Discussion of the Related Art

In general, an integrated circuit may include various logical devices such as an AND gate, a NAND gate, an OR gate, and/or a NOR gate and various type of synchronous elements such as flip-flops and latches. The synchronous element may operate based on a clock signal. Since the clock signal may be continuously toggled according to a reference cycle, power consumption by the toggling of the clock signal may be large.

It may be useful to consider the reduction of power consumption by the clock signal in designing integrated circuits.

SUMMARY

Some example embodiments of the present disclosure may provide a method of routing a clock tree having a routing structure capable of reducing power consumption.

Some example embodiments of the present disclosure may provide an integrated circuit including a clock tree having a routing structure capable of reducing power consumption.

Some example embodiments of the present disclosure may provide a method of designing an integrated circuit including a clock tree having a routing structure capable of reducing power consumption.

According to example embodiments of the present disclosure, there is provided method of routing a clock tree including a plurality of clock nets, included in an integrated circuit, where each of the plurality of clock nets includes at least one clock repeater. According to the method, a level of each of the plurality of clock nets is determined based on a number of clock gating cells that a clock signal passes through until the clock net receives the clock signal from a clock source and a plurality of conductive lines in each of the plurality of clock nets are routed by applying different routing rules to clock nets having different levels from among the plurality of clock nets based on the determined level. Each of the plurality of clock nets is configured to transfer the clock signal to a plurality of synchronous elements or another clock net. The plurality of synchronous elements operate in synchronization with the clock signal and are included in the integrated circuit.

According to example embodiments of the present disclosure, an integrated circuit includes a clock tree and the clock tree includes a clock source, a plurality of synchronous elements operating in synchronization with a clock signal provided by the clock source, a plurality of clock nets between the clock source and the plurality of synchronous elements and a plurality of clock gating cells between the plurality of clock nets. A plurality of conductive lines in each of the plurality of clock nets are routed by applying different routing rules to ones of the plurality of clock nets based on a level of each of the plurality of clock nets. The level of a clock net of the plurality of clock nets is determined based on a number of the plurality of clock gating cells that the clock signal passes through until the clock net receives the clock signal from the clock source. Each of the plurality of clock nets is configured to transfer the clock signal to the plurality of synchronous elements or another clock net.

According to example embodiments of the present disclosure, there is provided a method of designing an integrated circuit. According to the method, input data defining an integrated circuit is received, a plurality of clock gating cells and a plurality of synchronous elements are provided as a portion of a plurality of standard cells in a standard cell library, placement and routing is performed based on the input data and the standard cell library and output data defining the integrated circuit is generated based on a result of the placement and the routing. For performing placement and routing, a level of each clock net of a plurality of clock nets is determined based on a number of clock gating cells through which a clock signal passes to reach the clock net from a clock source and a plurality of conductive lines in each of the plurality of clock nets are routed by applying different routing rules to clock nets having different levels based on the determined level. The plurality of synchronous elements operate in synchronization with the clock signal and are included in the integrated circuit.

Accordingly, the method of routing a clock tree, the integrated circuit, and the method of designing the integrated circuit according to example embodiments of the present disclosure may reduce power consumption due to capacitance by determining a level of each of the plurality of clock nets based on a number of clock gating cells which each of the plurality of clock nets passes through until each of the plurality of clock nets receives the clock signal from the clock source and by increasing a routing space of conductive lines in a corresponding clock net as the level of the clock net decreases.

BRIEF DESCRIPTION OF THE DRAWINGS

Example embodiments of the present disclosure will be more clearly understood from the following detailed description taken in conjunction with the accompanying drawings.

FIG. 3 illustrates an example of routing conductive lines in each of the plurality of clock nets in the method of FIG. 1 according to example embodiments of the present disclosure.

FIG. 4 illustrates an example of routing conductive lines in each of the plurality of clock nets in the method of FIG. 1 according to example embodiments of the present disclosure.

FIG. 5 illustrates an example of a clock tree included in an integrated circuit according to example embodiments of the present disclosure.

FIGS. 9A and 9B illustrate examples of a routing spacing rule, also referred to as a clock spacing rule (CSR), of conductive lines in a clock net according to example embodiments of the present disclosure.

DETAILED DESCRIPTION OF THE EMBODIMENTS

Figure 1:
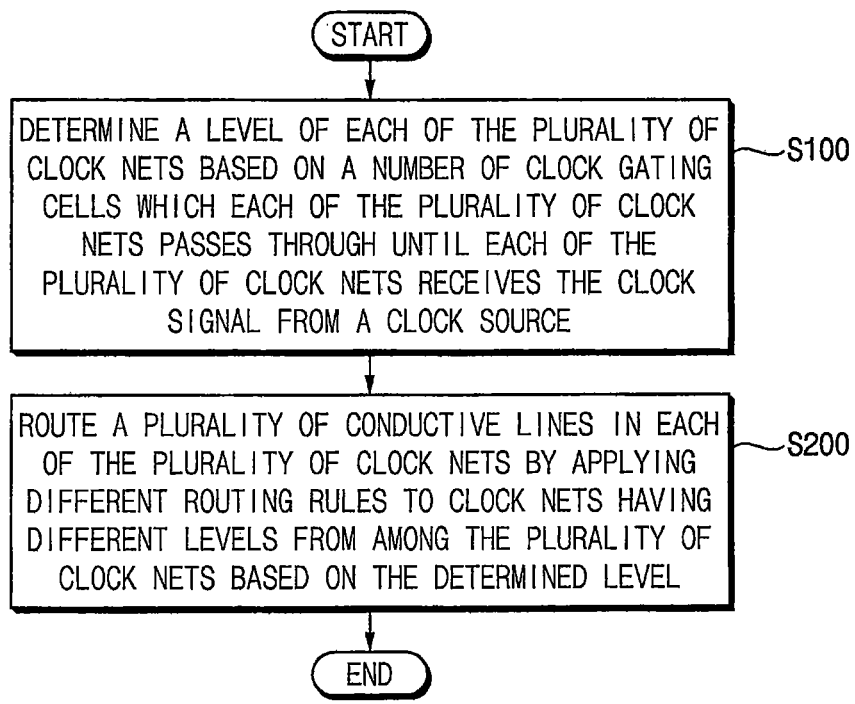
FIG. 1 is a flow chart illustrating a method of routing a clock tree included in an integrated circuit according to example embodiments of the present disclosure.

Various example embodiments will be described more fully hereinafter with reference to the accompanying drawings, in which some example embodiments are shown. In the drawings, like numerals refer to like elements throughout. The repeated descriptions may be omitted.

FIG. 1 is a flow chart illustrating a method of routing a clock tree included in an integrated circuit according to example embodiments of the present disclosure.

Referring to FIG. 1, there is provided a method of routing a clock tree including a plurality of clock nets included in the integrated circuit, where each of the plurality of clock nets includes at least one clock repeater.

According to the method, a level of each of the plurality of clock nets is determined based on a number of clock gating cells which each of the plurality of clock nets transferring a clock signal to a plurality of synchronous elements or another clock net passes through until each of the plurality of clock nets receives the clock from the clock source (operation S100). The plurality of synchronous elements may operate in synchronization with the clock signal and are included in the integrated circuit.

A plurality of conductive lines in each of the plurality of clock nets are routed by applying different routing rules to clock nets having different levels from among the plurality of clock nets based on the determined level (operation S200).

That is, a first routing rule may be applied to a clock net having a zero level, a second routing rule may be applied to a clock net having a first level and be applied to a clock net having a zero level. In example embodiments, the first through third routing rules may include information on a routing space (gap) between adjacent conductive lines from among the plurality of conductive lines in each of the clock nets. In example embodiments, the first through third routing rules may include information on a routing space (gap) between adjacent conductive lines from among the plurality of conductive lines and a width of each of the conductive lines in each of the clock nets.

Figure 2:
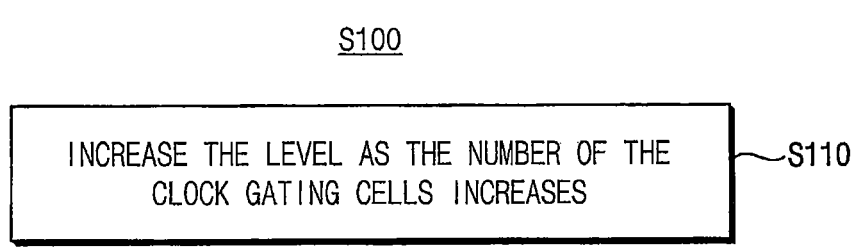
FIG. 2 is an example of determining a level of each of the plurality of clock nets in the method of FIG. 1 according to example embodiments of the present disclosure.

FIG. 2 is an example of determining a level of each of the plurality of clock nets in a method of FIG. 1 according to example embodiments of the present disclosure.

Referring to FIG. 2, for determining a level of each of the plurality of clock nets (operation S100), the level of each of the plurality of clock nets may be increased as a number of the clock gating cells which are passed through increases (operation S110).

In example embodiments, a clock signal toggling with a regular period may be provided to the clock nets directly or via the clock gating cell. A clock net from among the plurality of clock nets that receives the clock signal directly from the clock source without the clock being passed through by the clock gating cell may have a level corresponding to zero.

A clock net from among the plurality of clock nets that receives the clock signal from the clock source via one clock gating cell may have a level corresponding to one (i.e., a first level). That is, each of the clock nets may have a level based on a number of clock gating cells which the clock signal passes through until each of the clock nets receives the clock signal. Each of the clock nets may have a level which increases as the number of clock gating cells through which the clock signal passes until each of the clock nets receives the clock signal increases.

FIG. 3 illustrates an example of routing conductive lines in each of the plurality of clock nets in the method of FIG. 1 according to example embodiments of the present disclosure.

Referring to FIG. 3, for routing a plurality of conductive lines in each of the plurality of clock nets (operation S200a), a routing space between adjacent conductive lines from among the plurality of conductive lines may be increased as the level decreases (operation S210).

For example, when a default routing rule of the integrated circuit defines a minimum space S (e.g., a space between adjacent ones of the conductive lines) and a minimum width W of the conductive lines, the conductive lines of each of the clock nets may have a width which is two times greater than the minimum width W and a space between adjacent ones of the conductive lines may be increased as the level decreases.

For example, the conductive lines in the clock net having zero level may be routed to have space corresponding to 3S, the conductive lines in the clock net having an intermediate level may be routed to have space corresponding to 2S and the conductive lines in the clock net having a highest level may be routed to have space corresponding to S. That is, the conductive lines in each of the clock nets may be routed based on a non-default routing rule according to a method of routing a clock tree according to example embodiments of the present disclosure.

As the level decreases, a toggle number of the clock signal on the conductive line in a corresponding clock net may increase. Therefore, when a routing space between the conductive lines is increased as the level decreases, a power consumption which may occur in the adjacent conductive lines due to coupling capacitance may be reduced.

FIG. 4 illustrates an example of routing conductive lines in each of the plurality of clock nets in the method of FIG. 1 according to example embodiments of the present disclosure.

Referring to FIG. 4, the conductive lines may be provided by using a plurality of metal layers which are sequentially stacked in a vertical direction from a substrate in which the integrated circuit is provided and the plurality of metal layers may have degrees that increase based on stacked order.

For routing a plurality of conductive lines in each of the plurality of clock nets (operation S200b), a routing space between adjacent conductive lines from among the plurality of conductive lines may be increased as the level decreases (operation S210). In addition, the routing space in clock nets having a same level from among the plurality of clock nets may be increased as the degree of the metal layer increases (operation S230).

FIG. 5 illustrates an example of a clock tree included in an integrated circuit according to example embodiments of the present disclosure.

Referring to FIG. 5, a clock tree CT1 may include a clock source CS, a plurality of clock nets CN1, CN2 and CN3, a plurality of first clock gating cells CGC11~CGC1o (where o is an integer equal to or greater than two), a plurality of second clock gating cells CGC21~CGC2p (where p is an integer equal to or greater than two), a plurality of first synchronous elements SE11~SE1q (where q is an integer equal to or greater than two) and a plurality of second synchronous elements SE21~SE2r (where r is an integer equal to or greater than two).

The first clock gating cells CGC11~CGC1o may be enabled in response to a first enable signal EN1 and may perform a clock gating on a clock signal CK provided from the first clock net CN1 to the second clock net CN2. When the first enable signal EN1 is deactivated, the first clock gating cells CGC11~CGC1o may cut off propagation of the clock signal CK from the first clock net CN1.

The second clock gating cells CGC21~CGC2p may be enabled in response to a second enable signal EN2 and may perform a clock gating on the clock signal CK provided from the second clock net CN2 to the third clock net CN3. When the second enable signal EN2 is deactivated, the second clock gating cells CGC21~CGC2p may cut off propagation of the clock signal CK from the second clock net CN2.

Therefore, a first clock net CN1 may have a zero level LV0 and a second clock net CN2 may have a first level LV1.

The first clock net CN1 may include a plurality of first clock repeaters CR11~CR1s (where s is an integer equal to or greater than two), the second clock net CN2 may include a plurality of second clock repeaters CR21~CR2t (where t is an integer equal to or greater than two) and a third clock net CN3 may include a plurality of third clock repeaters CR31~CR3u (where u is an integer equal to or greater than two).

Each of the first clock repeaters CR11~CR1s in the first clock net CN1 receives the clock signal CK directly from the clock source CS. That is, the clock signal CK is provided to each of the first clock repeaters CR11~CR1s without the clock signal CK passing through a clock gating cell.

Each of the second clock repeaters CR21~CR2t in the second clock net CN2 receives the clock signal CK from the clock source CS via a corresponding one of the first clock gating cells CGC11~CGC1o. Each of the third clock repeaters CR31~CR3u in the third clock net CN3 receives the clock signal CK from the clock source CS via a corresponding one of the first clock gating cells CGC11~CGC1o and a corresponding one of the second clock gating cells CGC21~CGC2p and provides the clock signal CK to the second synchronous elements SE21~SE2r.

Therefore, a level of the first clock net CN1 may be determined to have a zero level LV0, a level of the second clock net CN2 may be determined to have a first level LV1, and a level of the third clock net CN3 may be determined to have a second level LV2.

According to example embodiments, a level of each of the clock nets CN1, CN2, and CN3 is determined based on a number of clock gating cells which each of the clock nets CN1, CN2, and CN3 passes through until each of the clock nets CN1, CN2 and CN3 receives the clock CK from the clock source CS, and a plurality of conductive lines are routed in each of the clock nets CN1, CN2, and CN3 by applying different routing rules to clock nets having different levels from among the clock nets CN1, CN2, and CN3 based on the determined level.

Figure 6:
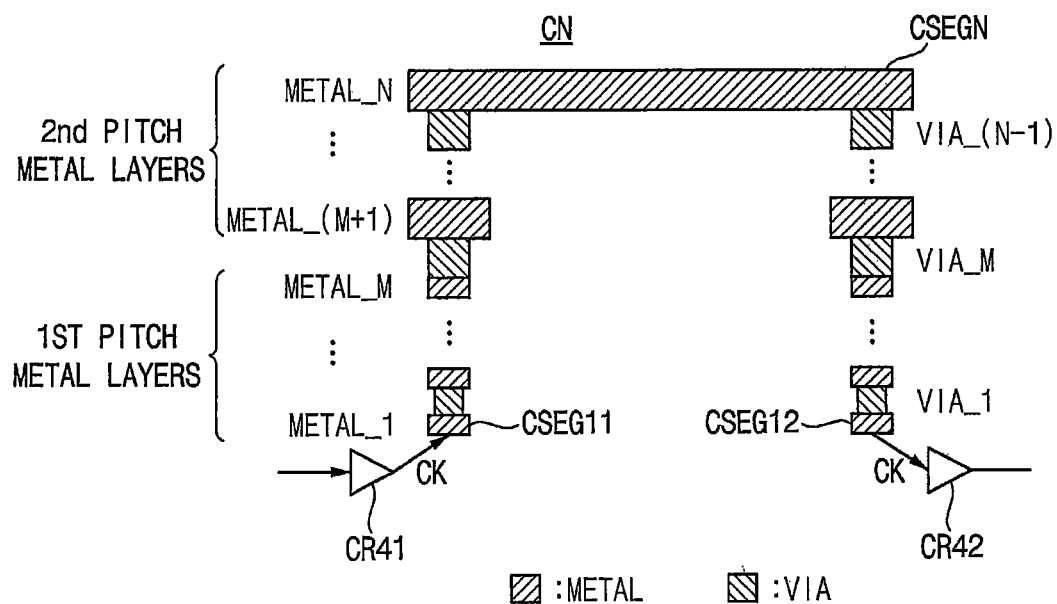
FIG. 6 illustrates an example of one of the plurality of clock nets in the clock tree of FIG. 5 according to example embodiments of the present disclosure.

FIG. 6 illustrates an example of one of the plurality of clock net in the clock tree of FIG. 5 according to example embodiments of the present disclosure.

Referring to FIG. 6, a clock net CN may include clock repeaters CR41 and CR42, a plurality of metal layers METAL_1~METAL_M and METAL_(M+1)~METAL_N constituent conductive lines and a plurality of vias VIA_1~VIA_M. Here, M is an integer equal to or greater than two and N is an integer greater than M.

Each of the metal layers METAL_1~METAL_M may have a width based on a first pitch and each of the metal layers METAL_(M+1)~METAL_N may have a width based on a second pitch greater than the first pitch.

The plurality of metal layers METAL_1~METAL_M and METAL_(M+1)~METAL_N may be sequentially stacked in a vertical direction from a substrate in which the integrated circuit is provided and may have degrees that increase based on stacked order. When a degree of the metal layer METAL_1 corresponds to '1', a degree of the metal layer METAL_M may correspond to 'M'.

Each of the plurality of vias VIA_1~VIA_M may be connected between two adjacent metal layers from among the metal layers METAL_1~METAL_M and METAL_(M+1)~METAL_N and may transfer signal between two adjacent metal layers. The plurality of metal layers METAL_1~METAL_M and METAL_(M+1)~METAL_N may constitute conductive lines (or conduction paths) through which the clock signal CK is transferred in the clock net CN.

The clock repeater CR41 may output the clock signal CK provided from the clock source or the clock gating cell to a conduction segment CSEG11 provided in the metal layer METAL_1. The clock repeater CR42 may repeat the clock signal CK provided from a conduction segment CSEG12 and may provide the clock signal CK to another clock gating cell or a synchronous element.

Referring to FIG. 6, the clock signal CK passes through a conduction segment CSEGN provided in the metal layer METAL_N (i.e., a highest metal layer) during a relatively longest time interval. Therefore, when a routing space between the conductive lines is increased as the degree of each of the metal layers in which the conductive lines are provided increases, a power consumption which may occur in the adjacent conduction segments CSEGN which have longest length and are provided in the highest metal layer METAL_N due to coupling capacitance may be reduced.

Figure 7:
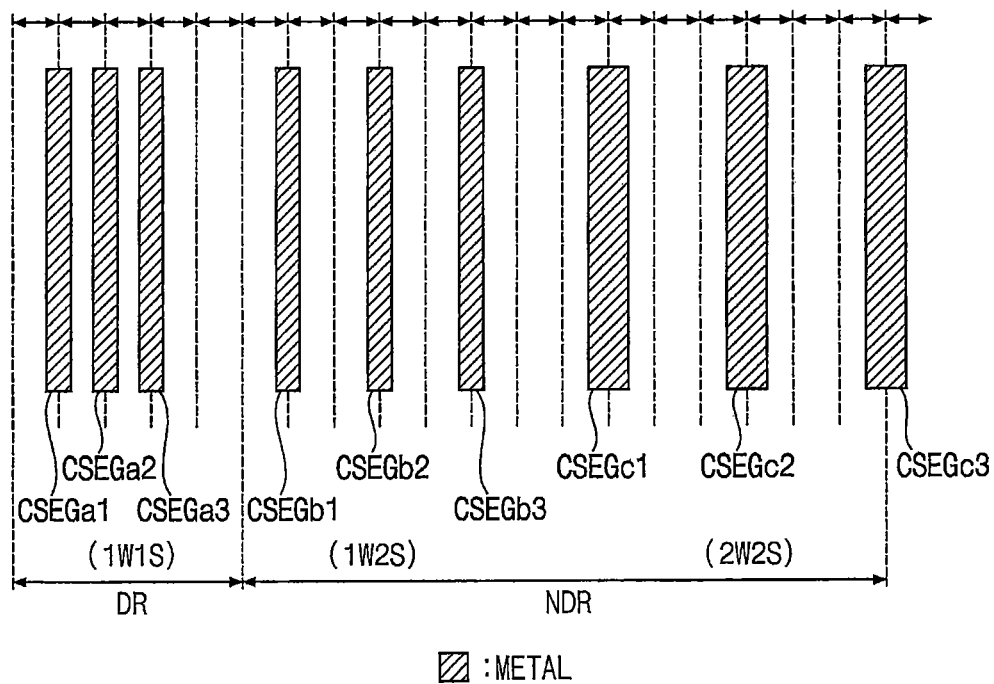
FIG. 7 illustrates an example of a routing rule of conductive lines according to example embodiments of the present disclosure.

FIG. 7 illustrates an example of a routing rule of conductive lines according to example embodiments of the present disclosure.

Referring to FIG. 7, each of the conduction segments (i.e., conductive lines) CSEGa1, CSEGa2, and CSEGa3, which are provided by using metal layers, are routed to have a minimum width 1W and a minimum routing space 1S between two adjacent conduction segments from among the conduction segments CSEGa1, CSEGa2, and CSEGa3 based on a default routing rule DR.

Each of the conduction segments CSEGb1, CSEGb2, and CSEGb3, which are provided by using metal layers, are routed to have a minimum width 1W and a routing space 2S between two adjacent conduction segments from among the conduction segments CSEGb1, CSEGb2, and CSEGb3 based on a non-default routing rule NDR.

Each of the conduction segments CSEGc1, CSEGc2, and CSEGc3, which are provided by using metal layers, are routed to have a width 2W and a routing space 2S between two adjacent conduction segments from among the conduction segments CSEGc1, CSEGc2, and CSEGc3 based on a non-default routing rule NDR.

Figure 8:
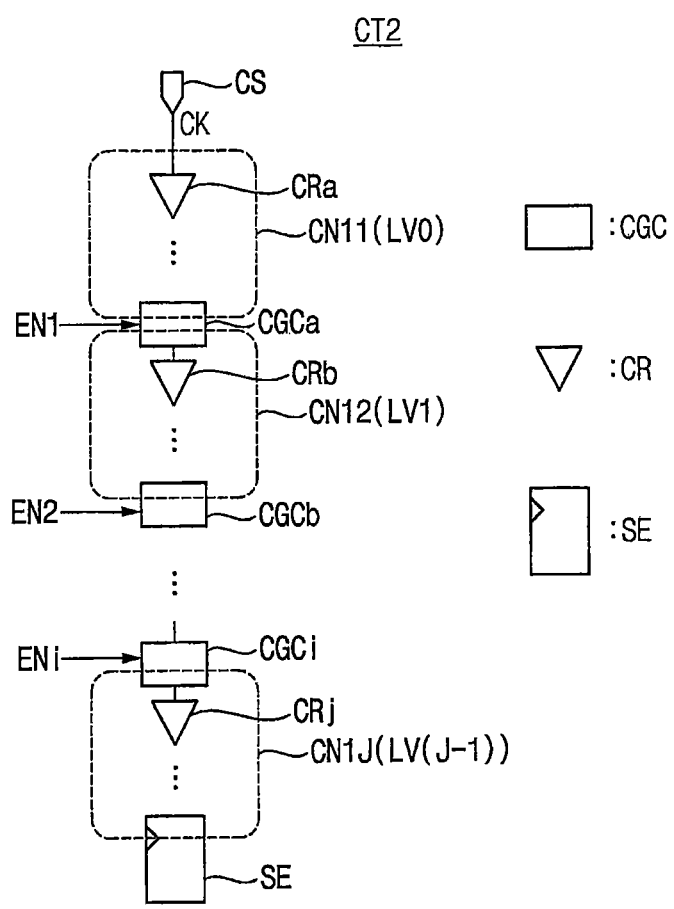
FIG. 8 illustrates an example of a clock tree included in an integrated circuit according to example embodiments of the present disclosure.

FIG. 8 illustrates an example of a clock tree included in an integrated circuit according to example embodiments of the present disclosure.

Referring to FIG. 8, a clock tree CT2 may include a clock source CS, a plurality of clock nets CN11, CN12, ..., CN1J (where J is an integer equal to or greater than four), a plurality of clock gating cells CGCa, CGCb, ..., CGCi (where i is an integer equal to or greater than three) and a synchronous element SE.

The clock net CN11 may include at least one clock repeater CRa, the clock net CN12 may include at least one clock repeater CRb and the clock net CN1J may include at least one clock repeater CRj.

Each of the plurality of clock gating cells CGCa, CGCb, ..., CGCi is connected between two adjacent clock nets from among the plurality of clock nets CN11, CN12, ..., CN1J, the clock gating cell CGCa may selectively transfer the clock signal CK provided from the clock net CN11 to the clock net CN12 in response to an enable signal EN1, the clock gating cell CGCb may selectively transfer the clock signal CK provided from the clock net CN12 to a clock net adjacent to the clock gating cell CGCb in response to an enable signal EN2, the clock gating cell CGCi may selectively transfer the clock signal CK provided from a previous clock net to the clock net CN1J in response to an enable signal ENi and the clock net CN1J may provide the clock signal CK to the synchronous element SE.

In example embodiments, each of the clock repeaters CRa, CRb, and CRj may include at least one of a buffer and/or an inverter and the synchronous element SE may include at least one of a flip-flop and/or a latch. As used herein, the term "and/or" includes any and all combinations of one or more of the associated listed items. Expressions such as "at least one of," when preceding a list of elements, modify the entire list of elements and do not modify the individual elements of the list.

As described with reference to FIG. 5, a level of each of the plurality of clock nets CN11, CN12, ..., CN1J may be determined based on a number of clock gating cells that each of the plurality of clock nets CN11, CN12, ..., CN1J transferring the clock signal CK to the synchronous element SE, or another clock net, passes through until each of the plurality of clock nets CN11, CN12, ..., CN1J receives the clock signal CK from the clock source CS. Stated another way, in some embodiments, the level of a given one of the plurality of clock nets CN11, CN12, ..., CN1J may be determined based on a number of clock gating cells through which the clock signal CK passes to reach the given one of the plurality of clock nets CN11, CN12, ..., CN1J. Therefore, the clock net CN11 may have a zero level LV0, the clock net CN12 may have a first level LV1, and the clock net CN1J may have a (J−1)-th level LV(J−1).

Each of the plurality of clock gating cells CGCa, CGCb, ..., CGCi may transfer the clock signal CK provided from a clock net having a K-th level to a clock net having a (K+1)-th level, in response to a corresponding enable signal. Here, K is an integer equal to or greater than zero.

Therefore, according to example embodiments, a routing space between the conductive lines in a corresponding clock net may be increased as the level of clock net decreases. A routing space between the conductive lines (e.g., a space between adjacent ones of the conductive lines) in the clock net CN11 having a zero level LV0 may be greater than a routing space between the conductive lines in the clock net CN1J having a (J−1)-th level LV(J−1).

Conductive lines in the clock nets having a same level may have a same switching activity. If the conductive lines in the clock net CN11 having a zero level LV0 has a switching activity SW(0), the conductive lines in the clock net CN1J having a (J−1)-th level LV(J−1) may have a switching activity SW((J−1)). The switching activity SW(0) may be equal to or greater than a switching activity SW(1), the switching activity SW(1) may be equal to or greater than a switching activity SW(2).

Here, the switching activity may be defined as an amount of power consumed according to the number of toggles of a signal or a clock per a reference time period. That is, when it is described that the switching activity of a signal or a clock is great, it is meant that the number of times the signal or the clock is toggled in a reference time period is relatively large, or that relatively large amounts of power are consumed by the toggling.

A dynamic power consumed in each of the plurality of clock nets CN11, CN12, ..., CN1J may be represented by Expression 1.

$$PWR \propto C \times V \times f \times SW \qquad \text{[Expression 1]}$$

In Expression 1, PWR denotes a dynamic power consumed in each of the clock nets, C denotes capacitance of conductive lines, V denotes a voltage applied to a corresponding clock net, f denotes a frequency of the clock signal CK, and SW denotes a switching activity of the clock signal CK.

If first conductive lines in a first clock net and second conductive lines in a first clock net have the same capacitance, since the switching activity SW increases as the level of the clock net decreases, a dynamic power consumed in a clock net having a lower level occupies a large portion of total power consumption. Therefore, when a routing space between conductive lines of a corresponding clock net is increased as the level of the clock net decreases, coupling capacitance in the clock net may be reduced.

FIGS. 9A and 9B illustrate examples of a routing spacing rule, also referred to as a clock spacing rule (CSR), of conductive lines in a clock net according to example embodiments of the present disclosure.

FIG. 9A illustrates an example of a CSR of conductive lines in a clock net based on levels of the clock nets and FIG. 9B illustrates an example of a CSR of conductive lines in a clock net based on levels of the clock nets and degrees of metal layers.

Referring to FIG. 9A, it is noted that the CSR increases as the level of the clock net decreases. For example, the CSR of the conductive lines in a clock net having a zero level LEVEL0 may correspond to 3S, the CSR of the conductive lines in a clock net having an F-th level LEVELF may correspond to 2S, and the CSR of the conductive lines in a clock net having a J-th LEVELJ may correspond to 1S, where F is greater than zero and less than J.

Referring to FIG. 9B, it is noted that the CSR increases in clock nets having the same level as the degree of the metal layer increases. For example, when a clock net has a zero level LEVEL0, the CSR of conductive lines in the clock net having a zero level LEVEL0 may increase from 2S to 3S as degrees of the metal layers increase from METAL_1 to METAL_N. When a clock net has an F-th level LEVELF, the CSR of conductive lines in the clock net having an F-th level LEVELF may increase from 1S to 3S as degrees of the metal layers increase from METAL_1 to METAL_N. When a clock net has a J-th level LEVELJ, the CSR of conductive lines in the clock net having a J-th level LEVELJ may increase from 1S to 2S as degrees of the metal layers increase from METAL_1 to METAL_N.

Hereinafter, structures of an integrated circuit according to example embodiments are described using a first direction X, a second direction Y, and a third direction Z in a three-dimensional space. The first direction X may be a row direction, the second direction Y may be a column direction, and the third direction Z may be a vertical direction. The first direction X, the second direction Y, and the third direction Z may intersect, e.g., may be orthogonal or perpendicular to one another.

Figure 10:
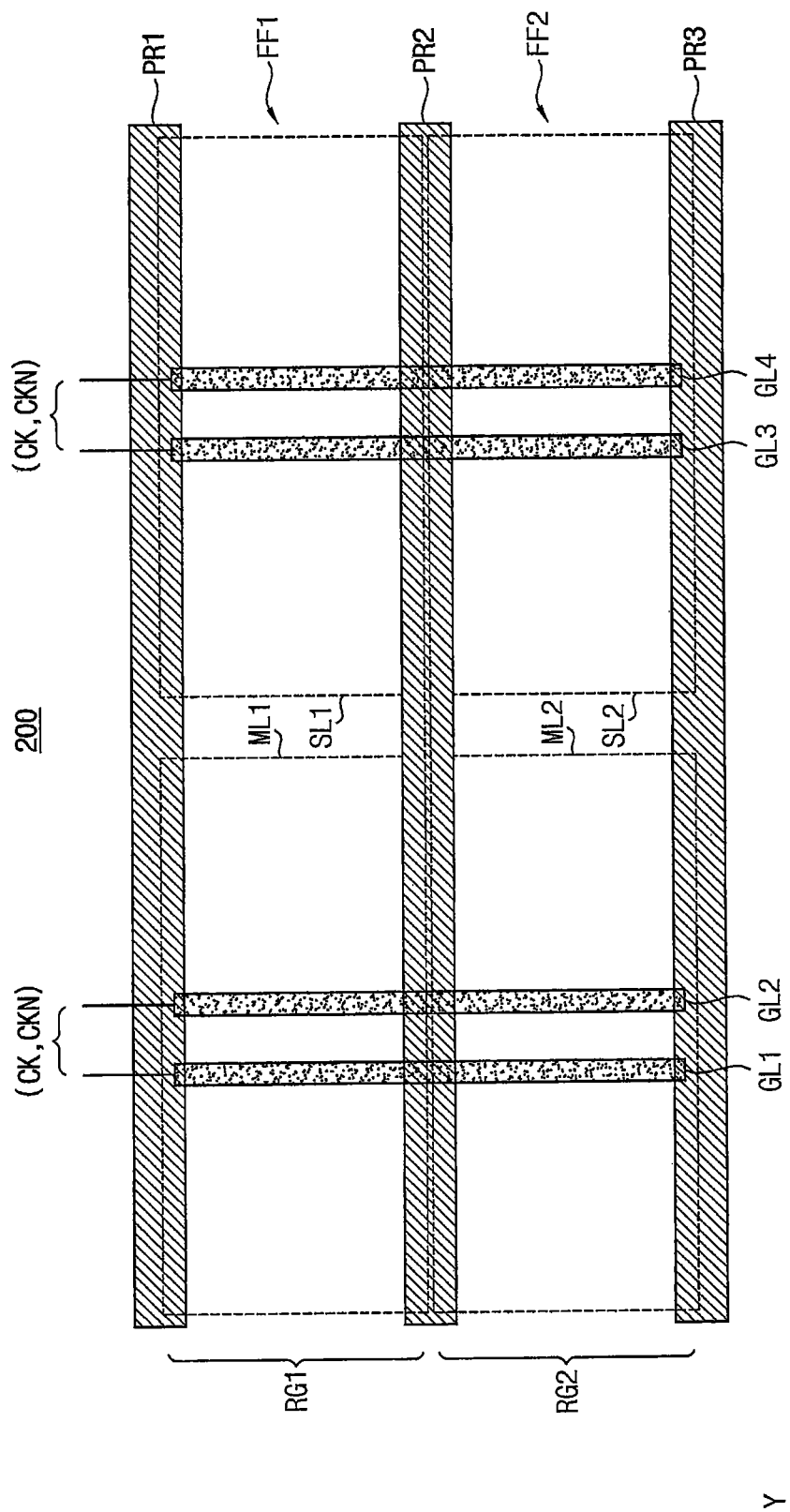
FIG. 10 is a diagram illustrating a layout of an integrated circuit having a clock routing structure according to example embodiments of the present disclosure.

FIG. 10 is a diagram illustrating a layout of an integrated circuit having a clock routing structure according to example embodiments of the present disclosure.

Referring to FIG. 10, an integrated circuit 200 may include a first power rail PR1, a second power rail PR2, a third power rail PR3, a first clock gate line GL1, a second clock gate line GL2, a third clock gate line GL3, and a fourth clock gate line GL4.

The first power rail PR1, the second power rail PR2, and the third power rail PR3 are formed above a semiconductor substrate and extend in the first direction X. The first power rail PR1, the second power rail PR2, and the third power rail PR3 are spaced apart from each other and arranged sequentially in the second direction Y.

The first clock gate line GL1, the second clock gate line GL2, the third clock gate line GL3 and the fourth clock gate line GL4 are formed above the semiconductor substrate and extend in the second direction Y to pass through a first region RG1 between the first power rail PR1 and the second power rail PR2 and a second region RG2 between the second power rail PR2 and the third power rail PR3. The first clock gate line GL1 and the second clock gate line GL2 are arranged to be adjacent to each other in the first direction X, and the third clock gate line GL3 and the fourth clock gate line GL4 are arranged to be adjacent to each other in the first direction Y. In this disclosure, the term "adjacent" represents that another gate line is not inserted between two adjacent gate lines.

One of the first clock gate line GL1 and the second clock gate line GL2 forms a first clock node to which a clock signal CK is applied, and the other of the first clock gate line GL1 and the second clock gate line GL2 forms a first inversion clock node to which an inverted clock signal CKN, which is an inversion signal of the clock signal CK, is applied. In addition, one of the third clock gate line GL3 and the fourth clock gate line GL4 forms a second clock node to which the clock signal CK is applied, and the other of the third clock gate line GL3 and the fourth clock gate line GL4 forms a second inversion clock node to which the inverted clock signal CKN is applied.

In some example embodiments, the integrated circuit 200 may be a multi-bit flip-flop circuit. In this case, a first flip-flop FF1 including a first master latch ML1 and a first slave latch SL1 may be formed in the first region RG1 and a second flip-flop FF2 including a second master latch ML2 and a second slave latch SL2 may be formed in the second region RG2. The first clock gate line GL1 and the second clock gate line GL2 may provide the clock signal CK and the inverted clock signal CKN to the first master latch ML1 and the second master latch ML2, and the third clock gate line GL3 and the fourth clock gate line GL4 may provide the clock signal CK and the inverted clock signal CKN to the first slave latch SL1 and the second slave latch SL2.

FIG. 10 illustrates a double-height standard cell having the first through fourth clock gate lines GL1~GL4 extended to pass through the two adjacent regions RG1 and RG2 defined by the three power rails PR1, PR2, and PR3. However, example embodiments may be applied to a layout of a multi-height standard cell in which the first through fourth clock gate lines GL1~GL4 pass through three or more adjacent regions defined by four or more power rails.

An occupation area of an integrated circuit may be reduced, and performance of the integrated circuit may be enhanced using the multi-height standard cell having an efficient clock routing structure.

Figure 11A:
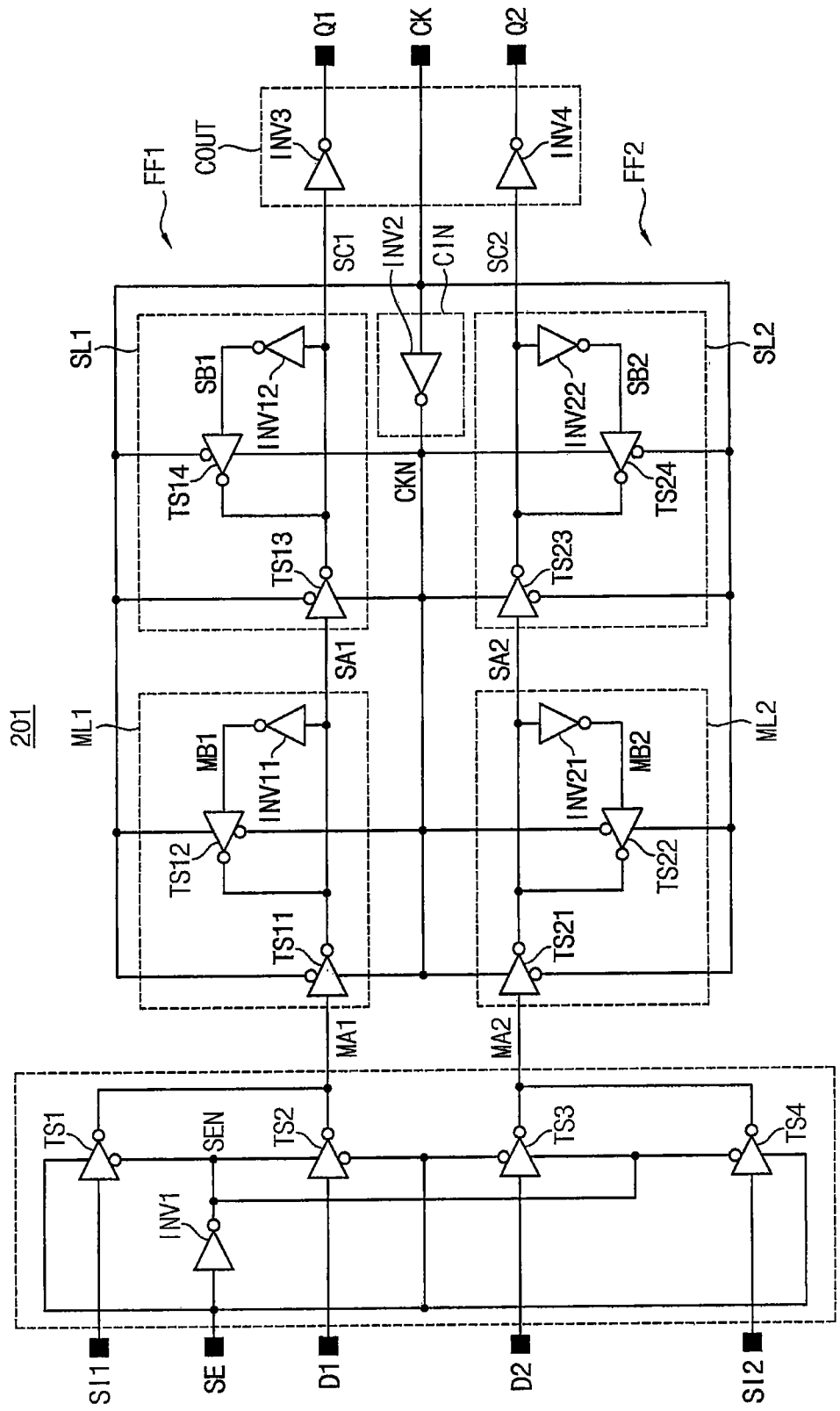
FIGS. 11A and 11B are diagrams illustrating examples of an integrated circuit applicable to the layout of FIG. 10.
Figure 11B:
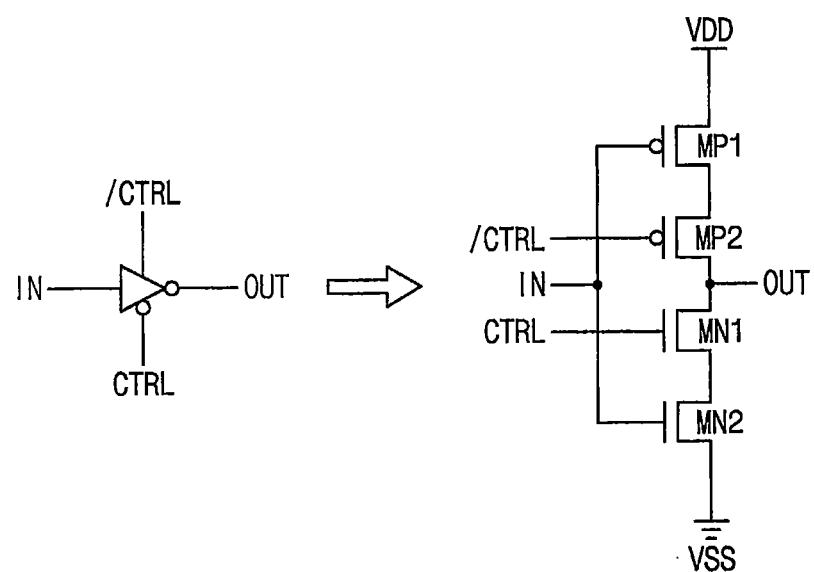

FIGS. 11A and 11B are diagrams illustrating examples of an integrated circuit applicable to the layout of FIG. 10.

Referring to FIG. 11A, an integrated circuit 201 may include a first flip-flop FF1 and a second flip-flop FF2. In some example embodiments, the integrated circuit 201 may further include an input circuit CIN and an output circuit COUT.

The first flip-flop FF1 may include a first master latch ML1 and a first slave latch SL1, and the second flip-flop FF2 may include a second master latch ML2 and a second slave latch SL2.

The first master latch ML1 may latch a first input signal MA1 in synchronization with the clock signal CK and an inverted clock signal CKN to generate a first master output signal SA1. The first slave latch SL1 may latch the first master output signal SA1 in synchronization with the clock signal CK and the inverted clock signal CKN to generate a first slave output signal SC1. The second master latch ML2 may latch a second input signal MA2 in synchronization with the clock signal CK and the inverted clock signal CKN to generate a second master output signal SA2. The second slave latch SL2 may latch the second master output signal SA2 in synchronization with the clock signal CK and the inverted clock signal CKN to generate a second slave output signal SC2.

The first master latch ML1 may include a first tri-state inverter TS11, a second tri-state inverter TS12, and an inverter INV11, and the first slave latch SL1 may include a third tri-state inverter TS13, a fourth tri-state inverter TS14, and an inverter INV12. The second master latch ML2 may include a fifth tri-state inverter TS21, a sixth tri-state inverter TS22, and an inverter INV21, and the second slave latch SL2 may include a seventh tri-state inverter TS23, an eighth tri-state inverter TS24, and an inverter INV22.

The first through eighth tri-state inverters TS11~TS14 and TS21~TS24 operate in synchronization with the clock signal CK and the inverted clock signal CKN.

An input node of the first tri-state inverter TS11 corresponds to a node of the first input signal MA1 and an output node of the first tri-state inverter TS11 corresponds to a node of the first master output signal SA1. In other words, the first tri-state inverter TS11 receives the first input signal MA1 and outputs the first master output signal SA1. The second tri-state inverter TS12 receives a first inverted master output signal MB1 and outputs the first master output signal SA1.

The third tri-state inverter TS13 receives the first master output signal SA1 and outputs the first slave output signal SC1. The fourth tri-state inverter TS14 receives a first inverted slave output signal SB1 and outputs the first slave output signal SC1.

The fifth tri-state inverter TS21 receives the second input signal MA2 and outputs the second master output signal SA2. The sixth tri-state inverter TS22 receives a second inverted master output signal MB2 and outputs the second master output signal SA2.

The seventh tri-state inverter TS23 receives the second master output signal SA2 and outputs the second slave output signal SC2. The eighth tri-state inverter TS24 receives a second inverted slave output signal SB2 and outputs the second slave output signal SC2.

The input circuit CIN may include inverters INV1 and INV2 and tri-state inverters TS1~TS4.

The input circuit CIN may operate in synchronization with a scan enable signal SE and an inverted scan enable signal SEN to provide one of a first scan input signal SI1 and a first data signal D1 as the first input signal MA1 and provide one of a second scan input signal SI2 and a second data signal D2 as the second input signal MA2. In addition, the input circuit CIN may provide the clock signal CK and the inverted clock signal CKN. The output circuit COUT may include inverters INV3 and INV4 to buffer the first slave output signal SC1 and the second slave output signal SC2 and output final output signals Q1 and Q2.

The integrated circuit 201 of FIG. 11A corresponds to an example of a two-bit flip-flop circuit of a master-slave type. The clock routing structure and the transistor arrangement based on the clock routing structure are not limited to the configuration of FIG. 11A and may be applicable to various integrated circuits.

FIG. 11B illustrates an example of a tri-state inverter.

Referring to FIG. 11B, the tri-state inverter may include a first input transistor MP1, a first clock transistor MP2, a second clock transistor MN1, and a second input transistor MN2, which are connected in series between a power supply voltage VDD and a ground voltage VSS.

The first clock transistor MP2 may pull up an output node generating an output signal OUT in response to an inverted control signal/CTRL, and the second clock signal MN1 may pull down the output node in response to a control signal CTRL. The first input transistor MP1 may electrically connect the first clock transistor MP2 to the power supply voltage VDD in response to an input signal IN, and the second input transistor MN2 may electrically connect the second clock transistor MN1 to the ground voltage VSS in response to the input signal IN.

Hereinafter, an example structure of a standard cell is described with reference to FIGS. 12, 13, 14 and 15, which may support understanding of a layout of an integrated circuit according to example embodiments of the present disclosure.

Figure 12:
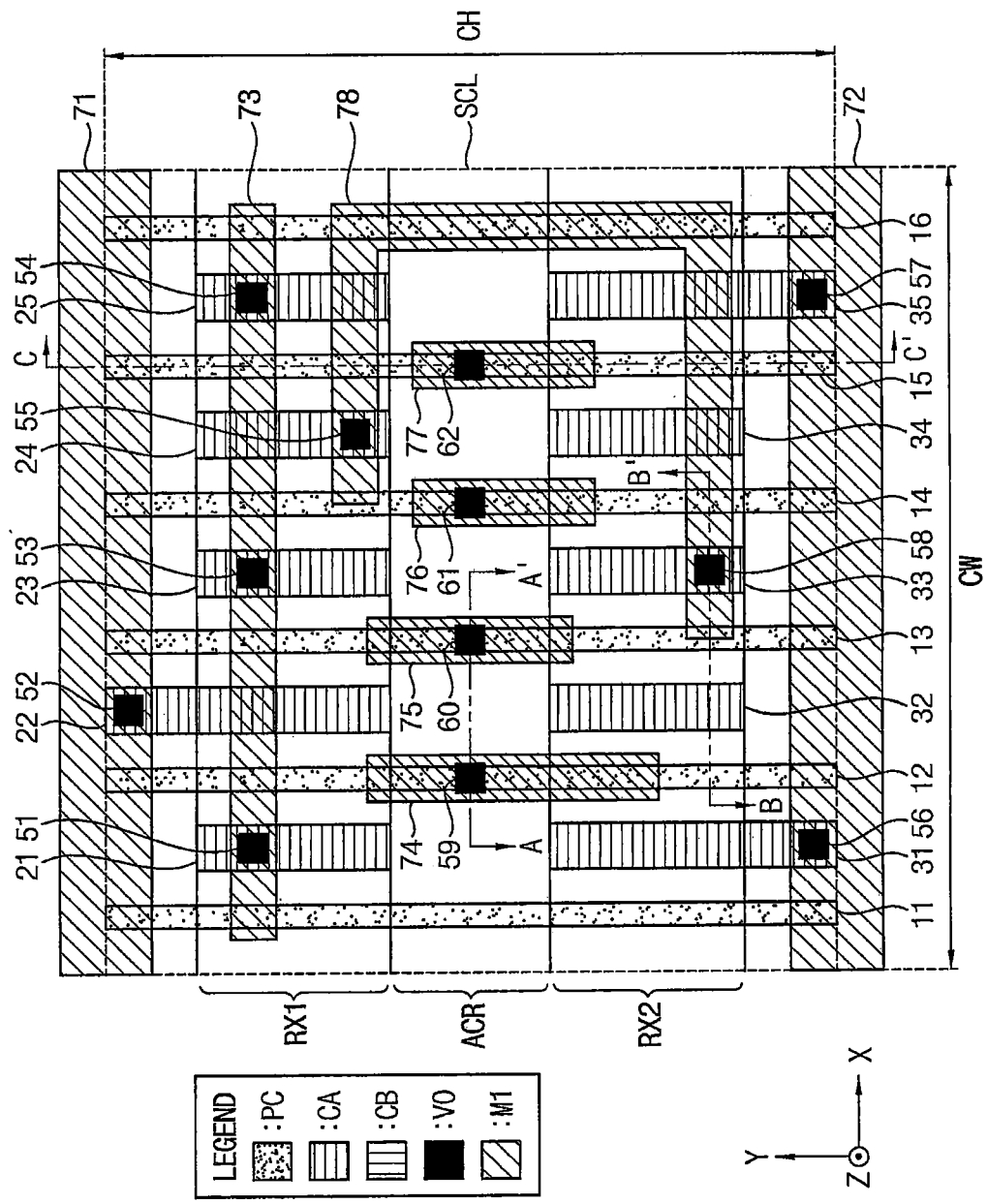
FIG. 12 is a diagram illustrating a layout of an example standard cell.
Figure 13:
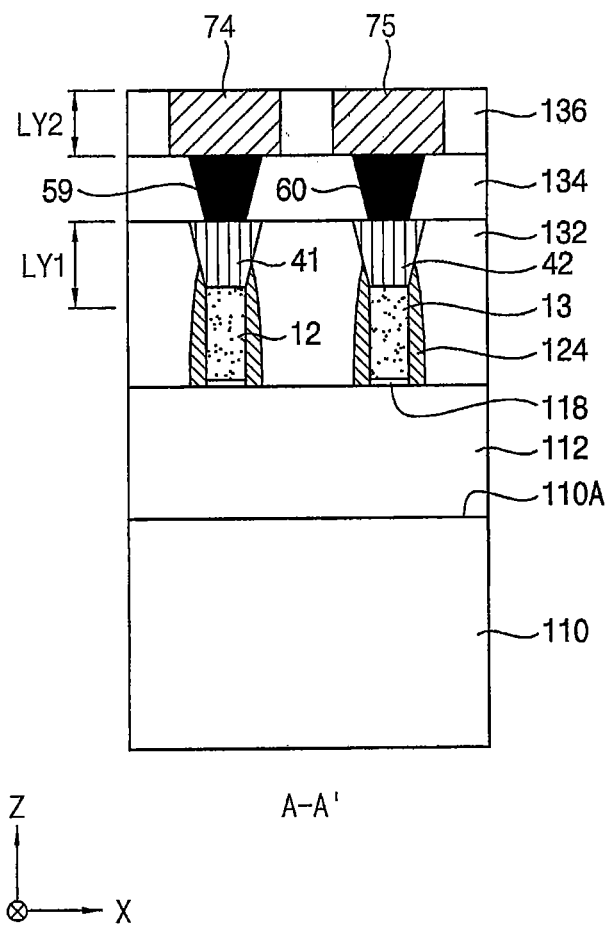
FIGS. 13, 14, and 15 are cross-sectional views of a standard cell that may have the same layout as the standard cell of FIG. 12.
Figure 14:
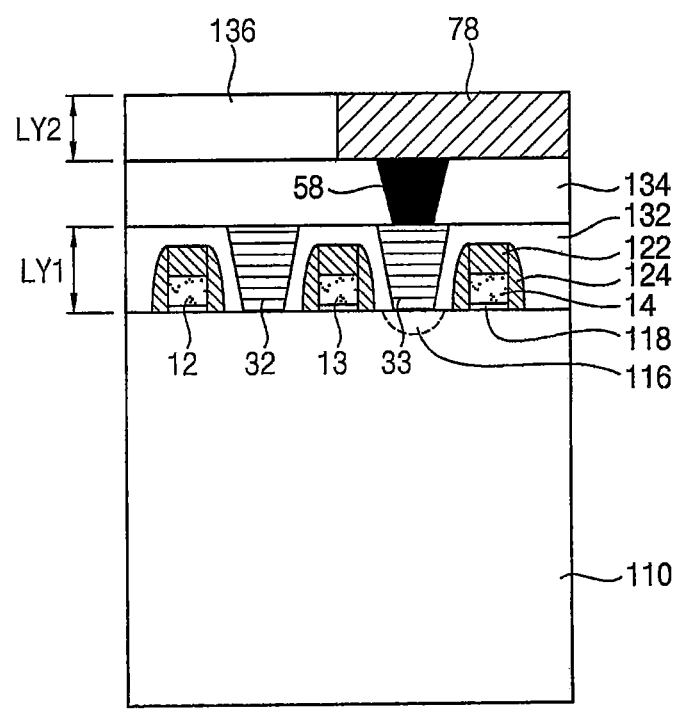
Figure 15:
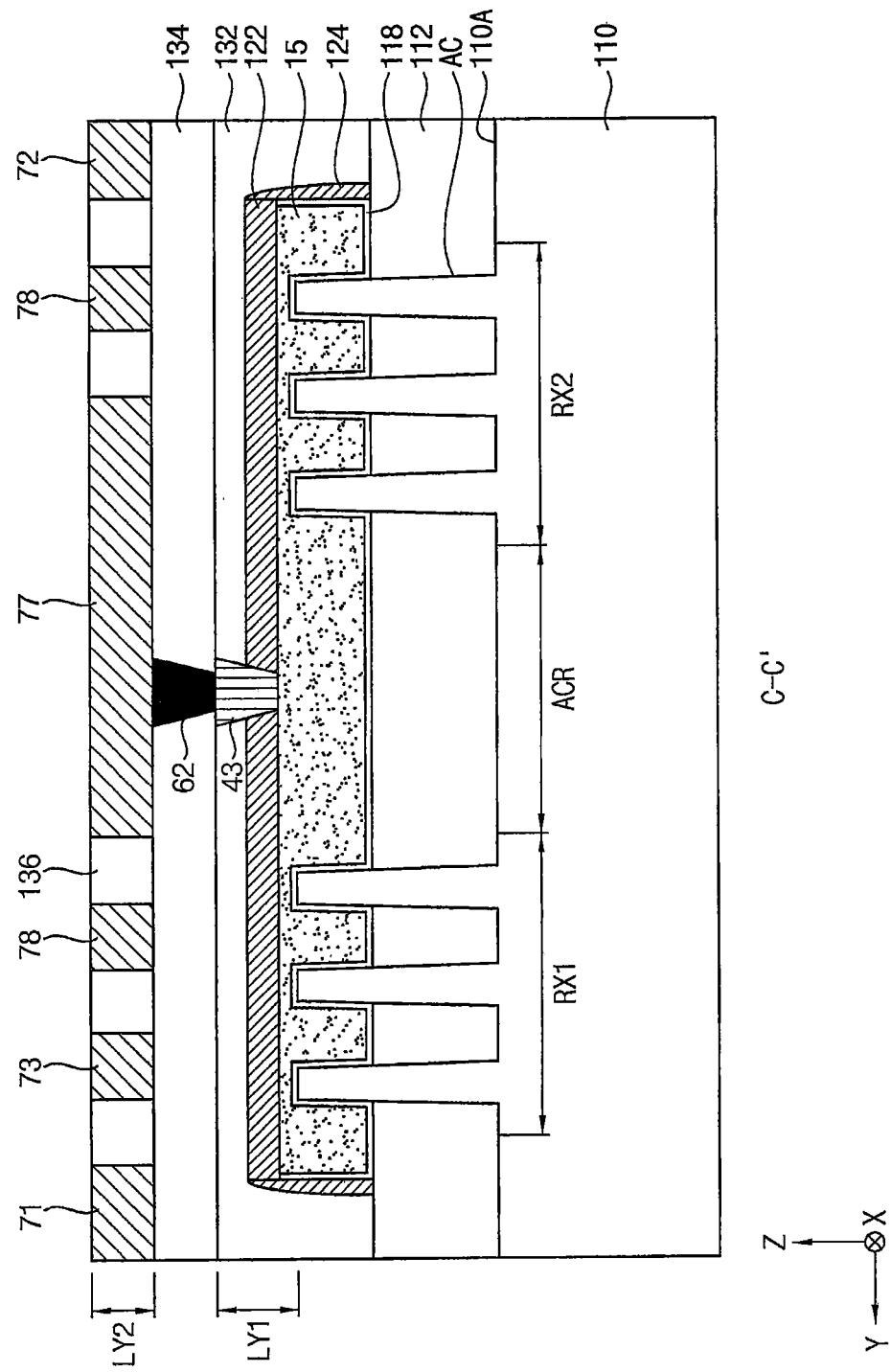

FIG. 12 is a diagram illustrating a layout of an example standard cell, and FIGS. 13, 14 and 15 are cross-sectional views of a standard cell that may have the same layout as the standard cell of FIG. 12.

FIGS. 13, 14 and 15 illustrate a portion of a standard cell SCL that includes a fin field effect transistor (FinFET). FIG. 13 is a cross-sectional view of the standard cell SCL of FIG. 12 along a line A-A'. FIG. 14 is a cross-sectional view of the standard cell SCL of FIG. 12 along a line B-B'. FIG. 15 is a cross-sectional view of the standard cell SCL of FIG. 12 along a line C-C'.

Referring to FIGS. 12, 13, 14 and 15, the standard cell SCL may be formed on a substrate 110 having an upper surface 110A that extends in a horizontal direction, e.g., the first direction X and the second direction Y. The standard cell SCL may include a first device area RX1, a second device area RX2, and an active cut area ACR separating the first and second device areas RX1 and RX2 along the second direction Y. Each of the first and second device areas RX1 and RX2 may include a plurality of fin-type active areas AC protruding along the third direction Z from the substrate 110 (see FIG. 15). In some example embodiments, the fin structure may be omitted in case of bulk MOS processes. The plurality of active areas AC may extend in parallel to one another in the first direction X. A device isolation layer 112 may be between the plurality of active areas AC on the substrate 110 along the second direction Y. The plurality of active areas AC protrude from the device isolation layer 112 along the third direction Z in the form of fins.

A plurality of gate insulation layers 118 and a plurality of gate lines PC 11, 12, 13, 14, 15, and 16 may be formed on the substrate 110. A plurality of metal oxide semiconductor (MOS) transistors may be formed along the plurality of gate lines PC 11, 12, 13, 14, 15 and 16. The MOS transistors may have a three-dimensional structure in which channels are formed in the upper surface and the two sidewalls of the active areas AC.

The gate insulation layers 118 may be formed of a silicon oxide layer, a high-k dielectric layer, or a combination thereof. The gate insulation layers 118 may be formed, e.g., by using an atomic layer deposition (ALD) method, a chemical vapor deposition (CVD) method, a physical vapor deposition (PVD) method, or the like.

The plurality of gate lines PC 11, 12, 13, 14, 15, and 16 may extend on the gate insulation layers 118 across the plurality of active areas AC while covering the upper surface and the two sidewalls of each of the active areas AC. A mask 122 may be formed on each of the gate lines PC. Side walls of the gate insulation layer 118, the gate line PC, and the mask 122 may be covered by a spacer 124. In some example embodiments, the gate mask 122 may be omitted, and the gate mask 122 may be removed at a portion of gate line PC to form a conductive contact for an upper structure.

The gate lines PC may have a structure in which a metal nitride layer, a metal layer, a conductive capping layer, and a gap-fill metal layer are sequentially stacked.

A plurality of conductive contacts CA and CB may be on a first layer LY1 on the active areas AC. The plurality of conductive contacts CA and CB include a plurality of first contacts CA 21, 22, 23, 24, 25, 31, 32, 33, 34, and 35 connected to a source/drain area 116 of the active areas AC (see FIG. 14) and a plurality of second contacts CB 41, 42, and 43 connected to the gate lines PC 11, 12, 13, 14, 15, and 16 (see FIGS. 13 and 15).

The plurality of conductive contacts CA and CB may be insulated from each other by a first interlayer insulation layer 132 that covers the active areas AC and the gate lines PC. The plurality of conductive contacts CA and CB may have an upper surface that is at substantially the same level as an upper surface of the first interlayer insulation layer 132. The first interlayer insulation layer 132 may be a silicon oxide layer.

A second interlayer insulation layer 134 and a plurality of lower via contacts V0 51, 52, 53, 54, 55, 56, 57, 58, 59, 60, 61, and 62 that pass through the second interlayer insulation layer 134 are on the first interlayer insulation layer 132.

A plurality of wirings M1 71, 72, 73, 74, 75, 76, 77, and 78 extending in the first direction X on a second layer LY2, which is higher than the first layer LY1, e.g., farther from the substrate 110 along the third direction Z, may be on the second interlayer insulation layer 134. Each of the wirings M1 may be connected to one of the plurality of conductive contacts CA and CB through one of the plurality of lower via contacts V0 formed between the first layer LY1 and the second layer LY2. Each of the plurality of lower via contacts V0 may be connected to one of the plurality of conductive contacts CA and CB, e.g., by passing through the second interlayer insulation layer 134.

The plurality of lower via contacts V0 may be insulated from one another by the second interlayer insulation layer 134. The wirings 71~78 may include an internal connection wiring that electrically connects a plurality of areas in the standard cell SCL. For example, the internal connection wiring 78 may electrically connect the active area AC in the first device area RX1 and the active area AC in the second device area RX2 through the lower via contacts 55 and 58 and the first contacts 24 and 33.

Wirings 71 and 72 may correspond to the first power rail PR1 and the second power rail PR2, respectively. The first power rail 71 may be connected to the active area AC in the first device area RX1. The second power rail 72 may be connected to the active area AC in the second device area RX2.

One of the first and second power rails 71 and 72 may be a wiring for supplying a power supply voltage (e.g., the first power supply voltage VDD) and the other of the first and second power rails 71 and 72 may be a wiring for supplying a ground voltage (e.g., the second power supply voltage VSS). The first power rail 71 and the second power rail 72 may extend in the first direction X parallel to one another on the second layer LY2. In some example embodiments, the power rails 71 and 72 may be formed at substantially the same time with the other wirings 73~78.

The wirings M1 may be pass through a third interlayer insulation layer 136. The third interlayer insulation layer 136 may insulate the wirings M1 from one another.

A cell height CH of the standard cell SCL may be defined by the distance along the second direction Y between the first power rail 71 and the second power rail 72. A cell width CW of the standard cell SCL may be defined along the first direction X that is parallel to the power rails 71 and 72.

The wirings M1 may correspond to conductive lines included in the clock net according to example embodiments, and when a routing space between the wirings M1 is increased as the level of the clock net decreases, coupling capacitance in the clock net may be reduced.

Hereinafter, the same reference marks or numerals may be used to indicate a signal and a node of the signal. For example, "CK" may be used to indicate a clock signal or a node to which the clock signal is applied.

Figure 16:
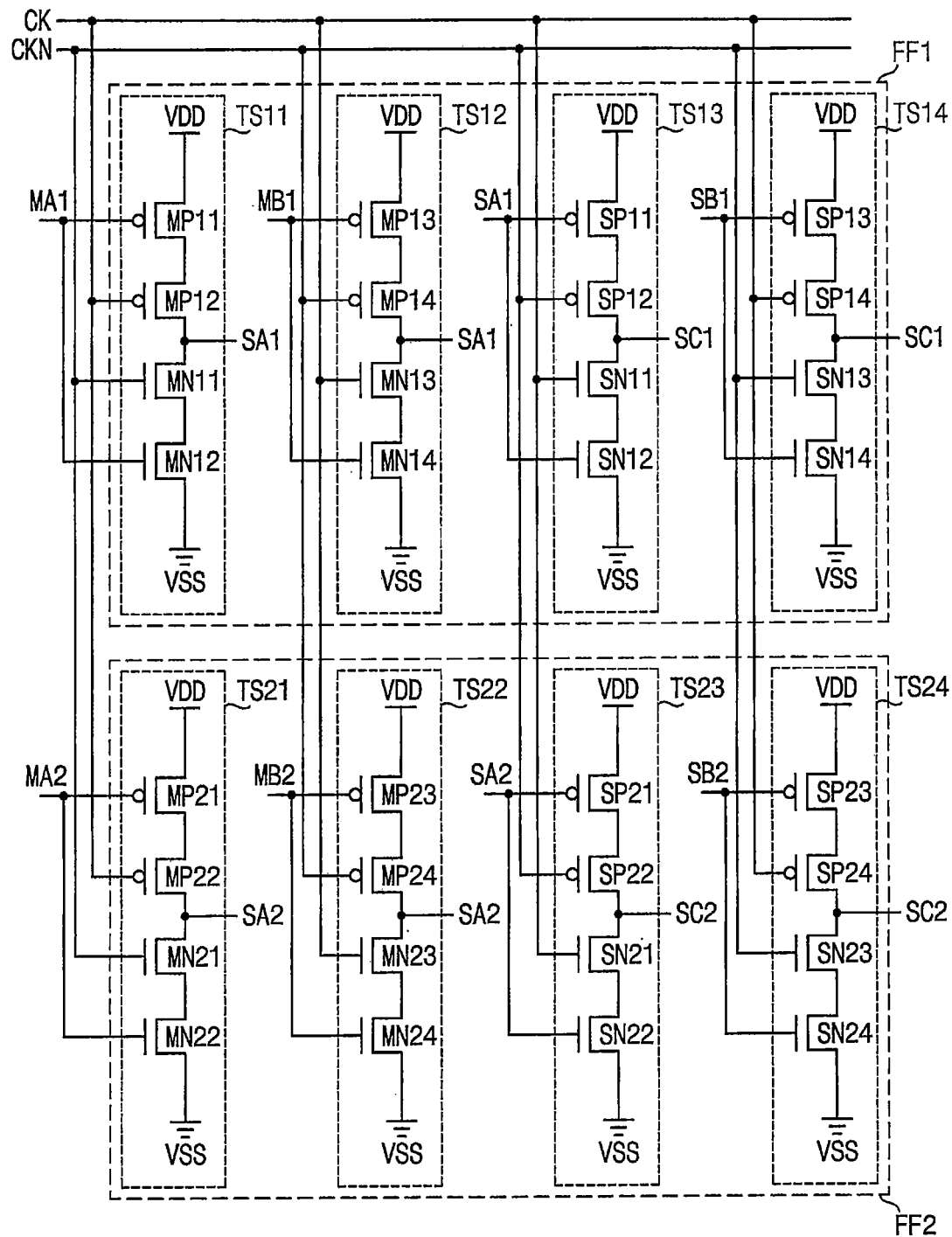
FIG. 16 is a circuit diagram illustrating an integrated circuit according to example embodiments of the present disclosure.

FIG. 16 is a circuit diagram illustrating an integrated circuit according to example embodiments of the present disclosure.

Referring to FIG. 16, an integrated circuit 202 may include a first flip-flop FF1 and a second flip-flop FF2. The first flip-flop FF1 may include first through fourth tri-state inverters TS11~TS14 operating in synchronization with a clock signal CK and an inverted clock signal CKN, and the second flip-flop FF2 may include fifth through eighth tri-state inverters TS21~TS24. Hereinafter, the descriptions repeated with FIG. 10 may be omitted.

The first tri-state inverter TS11 may include a first clock transistor MP12 pulling up the node of generating the first master output signal SA1 (that is, the node SA1) in response to the clock signal CK and a second clock transistor MN11 pulling down the node SA1 in response to the inverted clock signal CKN. The second tri-state inverter TS12 may include a third clock transistor MP14 pulling up the node of generating the first slave output signal SC1 (that is, the node SA1) in response to the inverted clock signal CKN and a fourth clock transistor MN13 pulling down the node SA1 in response to the clock signal CK.

The third tri-state inverter TS13 may include a fifth clock transistor SP12 pulling up the node SC1 in response to the inverted clock signal CKN and a sixth clock transistor SN11 pulling down the node SC1 in response to the clock signal CK. The fourth tri-state inverter TS14 may include a seventh clock transistor SP14 pulling up the node SC1 in response to the clock signal CK and an eighth clock transistor SN13 pulling down the node SC1 in response to the inverted clock signal CKN.

The fifth tri-state inverter TS21 may include a ninth clock transistor MP22 pulling up the node of generating the second master output signal SA2 (that is, the node SA2) in response to the clock signal CK and a tenth clock transistor MN21 pulling down the node SA2 in response to the inverted clock signal CKN. The sixth tri-state inverter TS22 may include an eleventh clock transistor MP24 pulling up the node SA2 in response to the inverted clock signal CKN and a twelfth clock transistor MN23 pulling down the node SA2 in response to the clock signal CK.

The seventh tri-state inverter TS23 may include a thirteenth clock transistor SP22 pulling up the node of generating the second slave output signal SC2 (that is, the node SC2) in response to the inverted clock signal CKN and a fourteenth clock transistor SN21 pulling down the node SC2 in response to the clock signal CK. The eighth tri-state inverter TS24 may include a fifteenth clock transistor SP24 pulling up the node SC2 in response to the clock signal CK and a sixteenth clock transistor SN23 pulling down the node SC2 in response to the inverted clock signal CKN.

As described above, each of the input P-type metal oxide semiconductor (PMOS) transistors MP11, MP13, SP11, SP13, MP21, MP23, SP21 and SP23 and the input N-type metal oxide semiconductor (NMOS) transistors MN12, MN14, SN12, SN14, MN22, MN24, SP22 and SP24 may connect a corresponding clock transistor to one of the power supply voltage VDD and the ground voltage VSS in response to corresponding one of the received signals MA1, MB1, SA1, SB1, MA2, MB2, SA2 and SB2.

Figure 17:
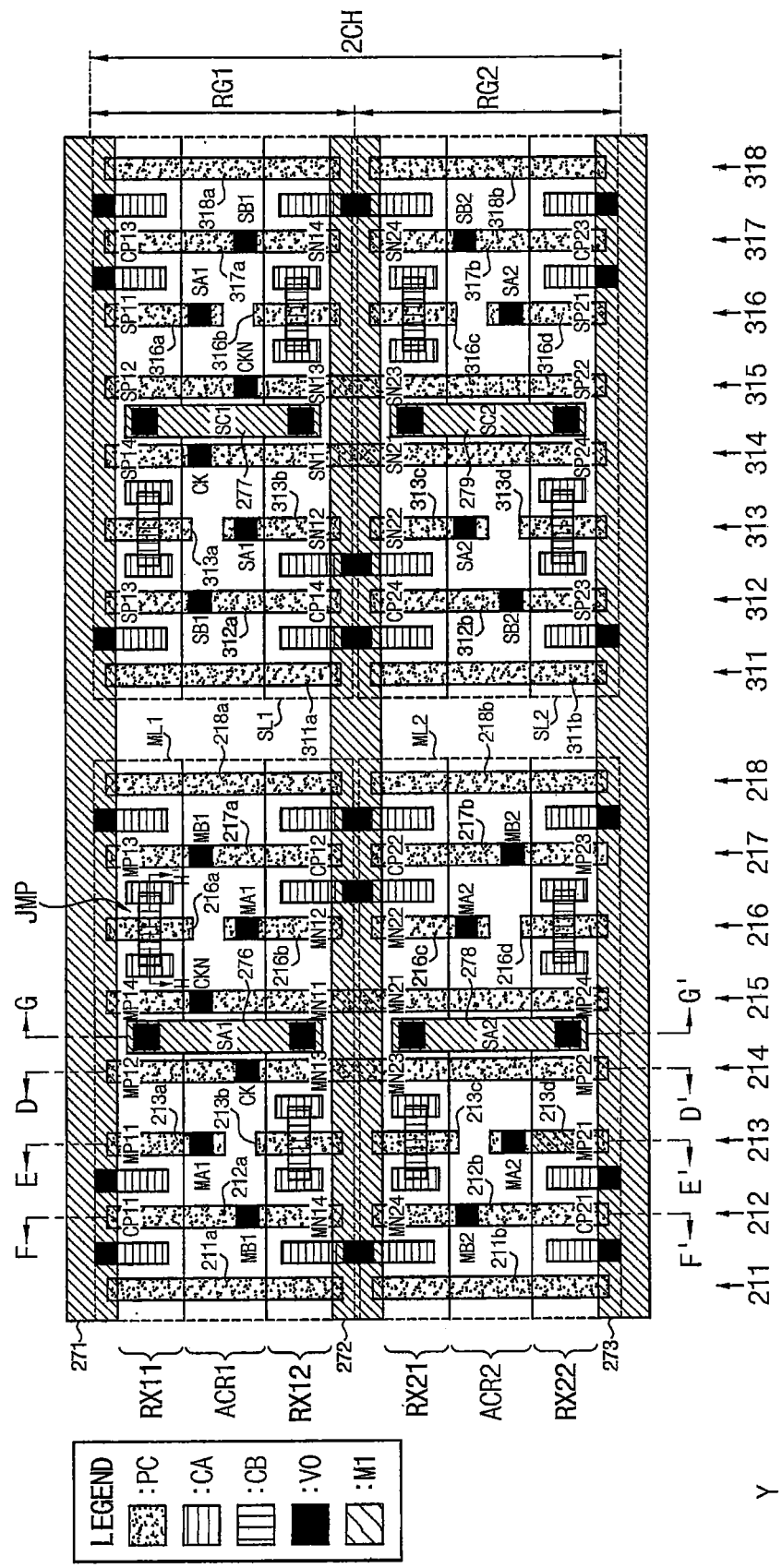
FIG. 17 is a diagram illustrating an example embodiment of a layout of a standard cell corresponding to the integrated circuit of FIG. 16.

FIG. 17 is a diagram illustrating an example embodiment of a layout of a standard cell corresponding to the integrated circuit of FIG. 16, and FIGS. 18A, 18B, 18C, 18D and 18E are cross-sectional views of a standard cell that may have the same layout as the standard cell of FIG. 17 according to example embodiments of the present disclosure.

Figure 18A:
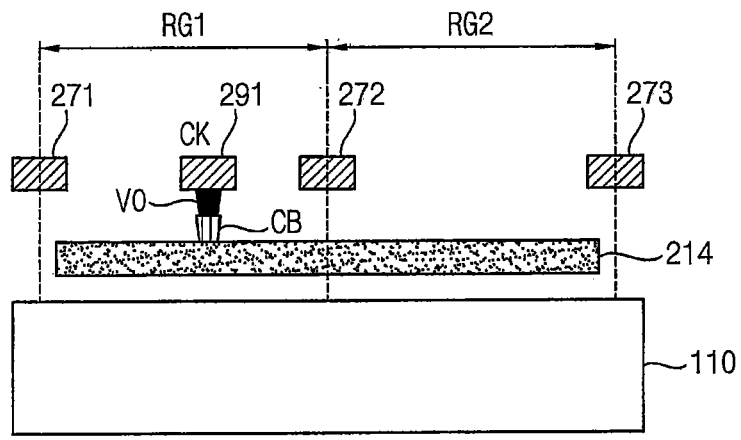
FIGS. 18A, 18B, 18C, 18D, and 18E are cross-sectional views of a standard cell that may have the same layout as the standard cell of FIG. 17 according to example embodiments of the present disclosure.
Figure 18B:
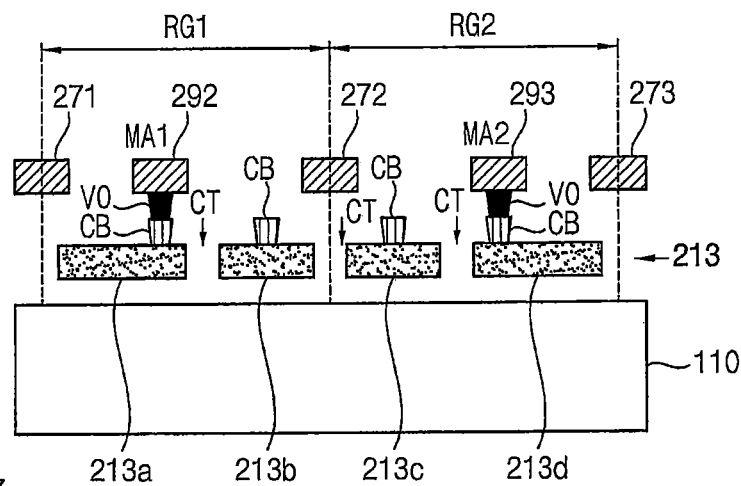
Figure 18C:
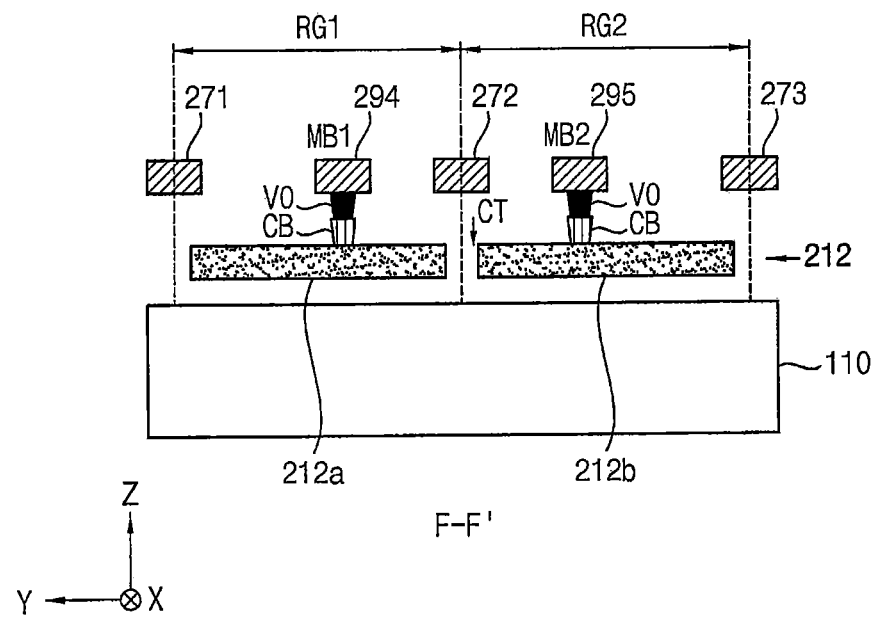
Figure 18D:
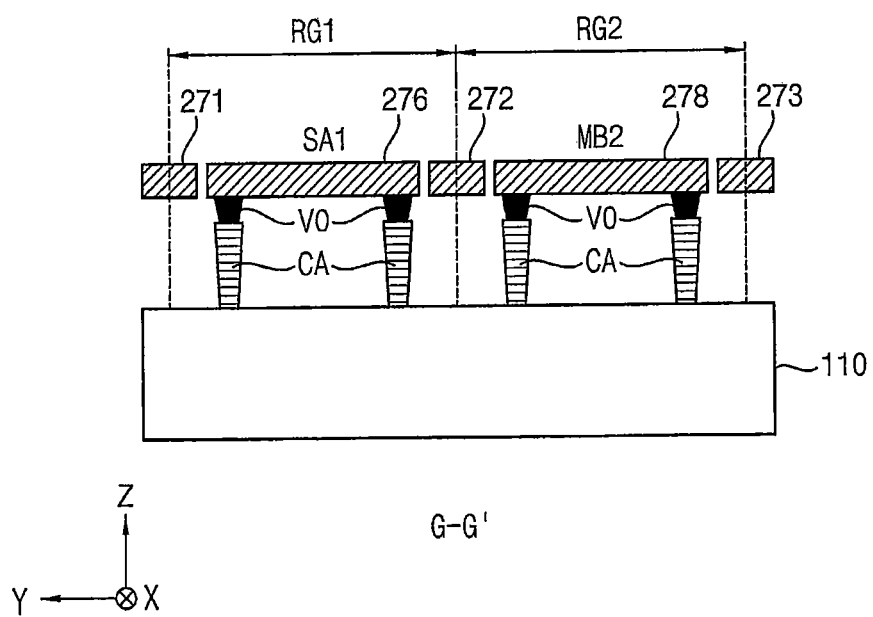
Figure 18E:
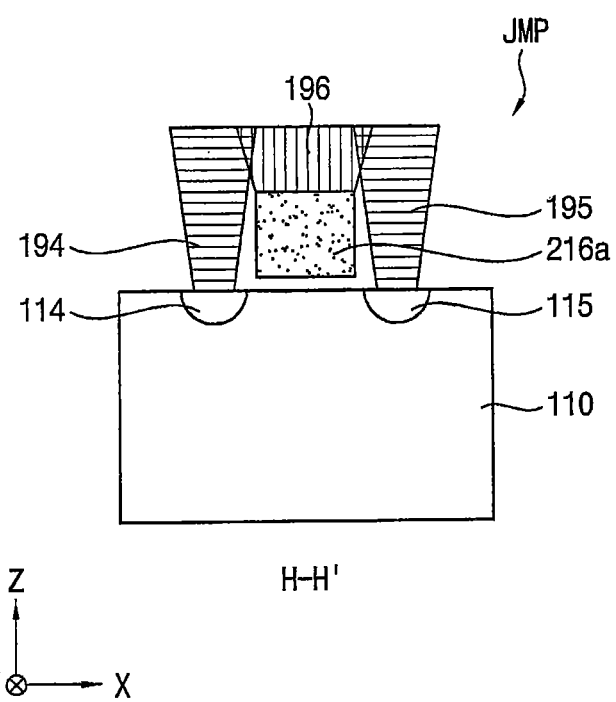

FIG. 18A is a cross-sectional view of the standard cell SCL of FIG. 17 along a line D-D'. FIG. 18B is a cross-sectional view of the standard cell SCL of FIG. 17 along a line E-E'. FIG. 18C is a cross-sectional view of the standard cell SCL of FIG. 17 along a line F-F'. FIG. 18D is a cross-sectional view of the standard cell SCL of FIG. 17 along a line G-G'. FIG. 18E is a cross-sectional view of the standard cell SCL of FIG. 17 along a line H-H'. The descriptions of elements discussed with respect to previous figures, including but not limited to FIGS. 12, 13, 14 and 15, may be omitted.

FIG. 17 illustrates the transistors included in the first through fourth tri-state inverters TS11~TS14 of the first master latch ML1 and the first slave latch SL1, and the transistors included in the fifth through eighth tri-state inverters TS21~TS24 of the second master latch ML2 and the second slave latch SL2. Other elements in the integrated circuit may be disposed properly between and/or sides of the master latches and the slave latches.

Referring to FIGS. 17, 18A, 18B, 18C, 18D, and 18E, a standard cell in a semiconductor substrate may include a first power rail 271, a second power rail 272, a third power rail 273, a plurality of gate lines 211~218 and 311~318, and column connection wirings 276~279 in a first metal layer M1, a row connection wiring 291, a column connection wiring 292, and connection wirings 293, 294, 295 in a second metal layer M2.

In FIG. 17, the nodes of the same reference marks may be electrically connected upper wirings (not shown). The conductive contacts CA and CB and the wirings in the first metal layer M1 may be connected through lower via contacts V0, and the wirings in the first metal layer M1 and the wirings in the second metal layer (not shown) may be connected through upper via contacts (not shown). The first metal layer M1 may be the lowest metal layer or have at least one metal layer under the first metal layer M1. The power rails 271, 272 and 273 may be formed in the first metal layer M1 as illustrated in FIGS. 6, 7A, 7B, 7C, 7D, and 7E, but example embodiments are not limited thereto.

At least one of the gate lines may be cut or separated by a gate cut region CT so that the gate line may include a plurality of gate segments. For example, the gate line 212 may include two gate segments 212a and 212b, and the gate line 213 may include four gate segments 213a, 213b, 213c and 213d.

The first flip-flop FF1 including the first master latch ML1 and the first slave latch SL1 may be formed in the first region RG1 between the first power rail 271 and the second power rail 272, and the second flip-flop FF2 including the second master latch ML2 and the second slave latch SL2 may be formed in the second region RG2 between the second power rail 272 and the third power rail 273. As such, the standard cell of FIG. 6 may have a cell height 2CH that is double a cell height CH of normal standard cells, e.g., as shown in FIG. 3, and the standard cell of FIG. 6 may be referred to as a double-height standard cell. In general, a standard cell having a cell height N*CH that is N times (N is an integer greater than one) the normal cell height CH may be referred to as a multi-height standard cell.

The first region RG1 may include a first device area RX11, a second device area RX12, and a first active cut area ACR1. The second region RG2 may include a third device area RX21, a fourth device area RX22, and a second active cut area ACR2. The region between the first region RG1 and the second region RG2 may be referred to as a boundary region.

In the example embodiment of FIG. 17, the first clock gate line 214 corresponds to a first clock node to which the clock signal CK is applied, the second clock gate line 215 corresponds to a first inversion clock node to which the inverted clock signal CKN is applied, the third clock gate line 314 corresponds to a second clock node to which the clock signal CK is applied, and the fourth clock gate line 315 corresponds to a second inversion clock node to which the inverted clock signal CKN is applied.

Referring to FIGS. 17 and 18A, each clock gate line of the first through fourth clock gate lines 214, 215, 314 and 315 is not cut by a gate cut area in the first and second regions RG1 and RG2. Accordingly, with respect to each clock gate line of the first through fourth clock gate lines 214, 215, 314 and 315, each clock gate line may connect first gate electrodes of clock transistors in the first region RG1 and second gate electrodes of clock transistors in the second region RG2. The first gate electrodes may correspond to portions of each clock gate line and the second gate electrodes may correspond to other portions of each clock gate line. For example, the gate electrodes of the first and fourth clock transistors MP12 and MN13 formed in the first region RG1 may be electrically connected to the gate electrodes of the ninth and twelfth clock transistors MP22 and MN23 formed in the second region RG2, through the first clock gate line 214.

Referring to FIGS. 17 and 18D, a node of generating an output signal of a latch may be formed between two clock gate lines. The node 276 of generating the first master output signal SA1 may be formed in the first region RG1 between the first clock gate line 214 and the second clock gate line 215, and the node 277 of generating the first slave output signal SC1 may be formed in the first region RG1 between the third clock gate line 314 and the fourth clock gate line 315. The node 278 of generating the second master output signal SA2 may be formed in the second region RG2 between the first clock gate line 214 and the second clock gate line 215, and the node 279 of generating the second slave output signal SC2 may be formed in the second region RG2 between the third clock gate line 314 and the fourth clock gate line 315.

Referring to FIGS. 17, 18B and 18C, the first master intermediate gate line 212 may be disposed at a side of the first clock gate line 214 and divided into a plurality of gate segments to provide the first inverted master output signal MB1 to the first master latch ML1 and provide the second inverted master output signal MB2 to the second master latch ML2. The first master input gate line 213 may be disposed between the first clock gate line 214 and the first master intermediate gate line 212 and divided into a plurality of gate segments to provide the first input signal MA1 to the first master latch ML1 and provide the second input signal MA2 to the second master latch ML2.

The second master intermediate gate line 217 may be disposed at a side of the second clock gate line 215 and divided into a plurality of gate segments to provide the first inverted master output signal MB1 to the first master latch ML1 and provide the second inverted master output signal MB2 to the second master latch ML2. The second master input gate line 216 may be disposed between the second clock gate line 215 and the second master intermediate gate line 217 and divided into a plurality of gate segments to provide the first input signal MA1 to the first master latch ML1 and provide the second input signal MA2 to the second master latch ML2.

The first slave intermediate gate line 312 may be disposed at a side of the third clock gate line 314 and divided into a plurality of gate segments to provide the first inverted slave output signal SB1 to the first slave latch SL1 and provide the second inverted slave output signal SB2 to the second slave latch SL2. The first slave input gate line 313 may be disposed between the third clock gate line 314 and the first slave intermediate gate line 312 and divided into a plurality of gate segments to provide the first master output signal SA1 to the first slave latch SL1 and provide the second master output signal SA2 to the second slave latch SL2.

The second slave intermediate gate line 317 may be disposed at a side of the fourth clock gate line 315 and divided into a plurality of gate segments to provide the first inverted slave output signal SB1 to the first slave latch SL1 and provide the second inverted slave output signal SB2 to the second slave latch SL2. The second slave input gate line 316 may be disposed between the fourth clock gate line 315 and the second slave intermediate gate line 317 and divided into a plurality of gate segments to provide the first master output signal SA1 to the first slave latch SL1 and provide the second master output signal SA2 to the second slave latch SL2.

In some example embodiments, as illustrated in FIG. 17, the power supply voltage VDD may be applied to the first power rail 271 and the third power rail 273, and the ground voltage VSS may be applied to the second power rail 272. In this case, the P-type transistors MP11~MP14, SP11~SP14, MP21~MP24 and SP21~SP24 may be formed in the first and third device areas RX11 and RX21, and the N-type transistors MN11~MN14, SN11~SN14, MN21~MN24 and SN21~SN24 may be formed in the second and fourth device areas RX12 and RX22.

One of two gate lines of transferring the same signal may form gate electrodes of PMOS transistors and the other of the two gate lines may form gate electrodes of NMOS transistors. As illustrated in FIG. 6, one of the first master intermediate gate line 212 and the second master intermediate gate line 217 forms a gate electrode of PMOS transistor and the other of the first master intermediate gate line 212 and the second master intermediate gate line 217 forms a gate electrode of an NMOS transistor. One of the first slave intermediate gate line 312 and the second slave intermediate gate line 317 forms a gate electrode of a PMOS transistor and the other of the first slave intermediate gate line 312 and the second slave intermediate gate line 317 forms a gate electrode of an NMOS transistor. One of the first master input gate line 213 and the second master input gate line 216 forms a gate electrode of a PMOS transistor and the other of the first master input gate line 213 and the second master input gate line 216 forms a gate electrode of an NMOS transistor. One of the first slave input gate line 313 and the second slave input gate line 316 forms a gate electrode of a PMOS transistor and the other of the first slave input gate line 313 and the second slave input gate line 316 forms a gate electrode of an NMOS transistor.

For example, in case of the first master intermediate gate line 212 and the second master intermediate gate line 217 that transfer the first input signal MA1 and the second input signal MA2 in FIG. 17, the first master intermediate gate line 212 may form the gate electrodes of the NMOS transistors MN14 and MN24, and the second master intermediate gate line 217 may form the gate electrodes of the PMOS transistors MP13 and MP23.

Each gate line of the first master intermediate gate line 212, the second master intermediate gate line 217, the first slave intermediate gate line 312 and the second slave intermediate gate line 317 may be cut at a boundary region between the first region RG1 and the second region RG1 to be divided into two gate segments. Each of the two segments may form a gate electrode and an electrode of each of capacitors CP11~CP14 and CP21~CP24. For example, the one gate segment 212a of the first master intermediate gate line 212 may form the gate electrode of the transistor MN14 and the electrode of the capacitor CP11.

Each gate line of the first master input gate line 213, the second master input gate line 216, the first slave input gate line 313 and the second slave input gate line 316 may be cut at the first region RG1, at the second region RG2, and at a boundary region between the first region RG1 and the second region RG2 to be divided into four gate segments. One of the first input signal MA1 and the second input signal MA2 may be applied to each of two gate segments of the four gate segments, and each of the other two gate segments of the four gate segments may form a portion of a jumper structure connecting active regions at both sides.

For example, the second master input gate line 216 may be divided into four gate segments 216a, 216b, 216c and 216d. One of the first input signal MA1 and the second input signal MA2 may be applied to each of the two gate segments 216b and 216c, and each of the other two gate segments 216a and 216d may form a portion of a jumper structure connecting active regions at both sides, as will be described with reference to FIG. 7E.

The active areas in both sides of a dummy gate segment may be connected through a jumper structure. For example, as illustrated in FIG. 18E, a jumper structure JMP may include the first contacts 194 and 195 formed on the active regions 114 and 115 and the second contact 196 formed on the gate segment 216a. The jumper structure JMP may be formed by combining the first contacts 194 and 195 and the second contact 196 as a form of one body. Using such jumper structure JMP, the gate segment 216a may be connected to the active regions 114 and 115.

Figure 19:
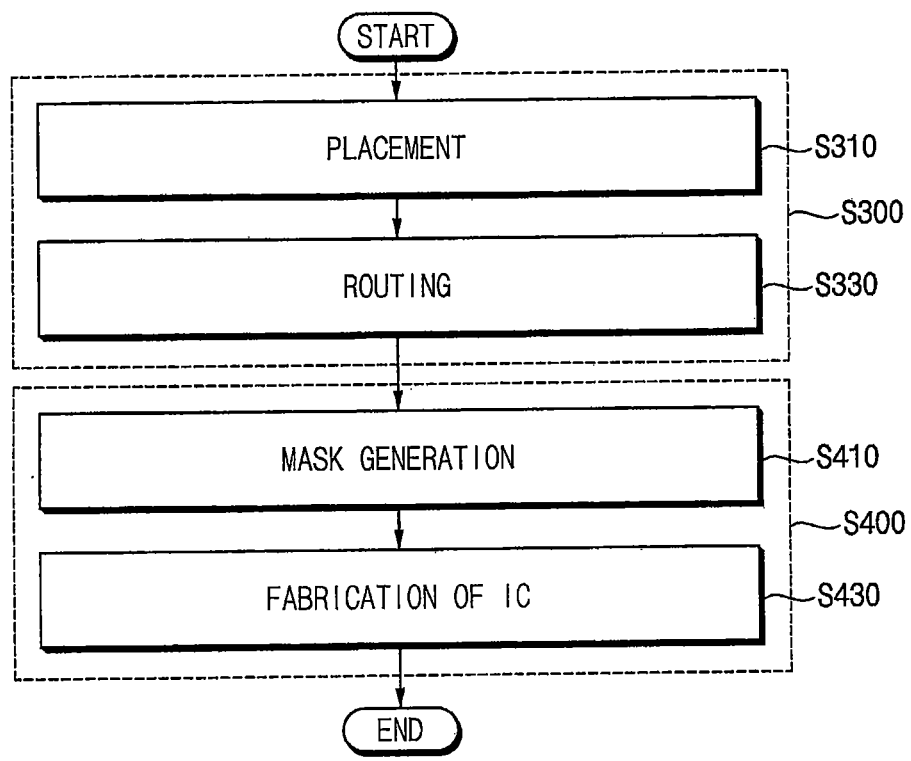
FIG. 19 is a flowchart illustrating a method of manufacturing an integrated circuit according to example embodiments of the present disclosure.

FIG. 19 is a flowchart illustrating a method of manufacturing an integrated circuit according to example embodiments of the present disclosure.

Referring to FIG. 19, according to example embodiments, a method of manufacturing an integrated circuit may include an integrated circuit designing operation S300 and an integrated circuit manufacturing process S400. The integrated circuit designing operation S300 may include operations S310 and S330, in which a layout of an integrated circuit is designed using a tool for designing an integrated circuit. In this case, the tool for designing the integrated circuit may be a program including a plurality of instructions executed by a processor. The program may be stored on a memory and, in some embodiments, on a non-transitory memory. Accordingly, the integrated circuit designing operation S300 may be referred to as a computer-implemented method of designing an integrated circuit that may be executed by a processor.

The integrated circuit manufacturing process S400 corresponds to an operation of manufacturing a semiconductor device according to an integrated circuit based on a designed layout, and may be performed by a semiconductor process device.

An integrated circuit may be defined by a plurality of cells. For example, an integrated circuit may be designed using a cell library that includes characteristic information of the plurality of cells. For example, in a cell library, cell names, dimensions, gate widths, pins, delay characteristics, leakage currents, threshold voltages, and functions of cells may be defined. In example embodiments, the cell library may be a standard cell library. The standard cell library may include information such as, for example, layout information and timing information of a plurality of standard cells. The cell library, including the standard cell library, may be stored in a computer-readable storage medium.

In operation S310, standard cells that define an integrated circuit are placed. Operation S110 may be performed, for example, by a processor using a placement and routing (P/R) tool. First, input data defining an integrated circuit is received. Here, the input data may be generated by synthesizing data for behaviors of an integrated circuit, for example, data defined in a register transfer level (RTL), by using a standard cell library. The input data may be, for example, a bit stream or a net list generated by synthesizing integrated circuits defined by a VHSIC hardware description language (VHDL) and a hardware description language (HDL) such as, for example, VERILOG. Subsequently, a storage medium storing a standard cell library is accessed, and standard cells, which are selected from among a plurality of standard cells stored in the standard cell library according to the input data, are placed. The standard cells may include clock gating cells and synchronous elements. When the plurality of standard cells are placed, a level of each of a plurality of clock nets is determined based on a number of clock gating cells that each of the plurality of clock nets transferring a clock signal to a plurality of synchronous elements or another clock net passes through until each of the plurality of clock nets receives the clock from the clock source, and a plurality of conductive lines in each of the plurality of clock nets are routed by applying different routing rules to clock nets having different levels from among the plurality of clock nets based on the determined level. The plurality of synchronous elements may operate in synchronization with the clock signal and are included in the integrated circuit.

In operation S330, nets are routed in the placed standard cells. The net may represent an equipotential in an equivalent circuit diagram of an integrated circuit. One net may correspond to one interconnection in a layout of an integrated circuit. The interconnection may correspond to, for example, a wiring structure including a plurality of wiring layers electrically connected to one another and vias. Each of the wiring layers may include, for example, a plurality of conductive patterns. The conductive patterns formed in the wiring layers, which may be disposed on different levels, may be electrically connected to one another through a via formed of a conductive material. In example embodiments, the wiring layers may include a metal as a conductive material, and may be referred to as metal layers.

After operation S330, output data defining the integrated circuit may be provided to a semiconductor process device. Here, the output data may have a format including all layout information of standard cells. For example, the output data may include pattern information of all of the layers, and may have, for example, a graphic design system (GDS) II format. Further, the output data may have a format including external information of a standard cell such as, for example, a pin of a standard cell.

However, example embodiments are not limited thereto. For example, in example embodiments, operation S300 may include various operations relating to designing an integrated circuit such as, for example, generation of a standard cell library, correction of a standard cell library, and verification of a layout. Further, in an example embodiment, operations S310 and S330 may correspond to a backend design process of an integrated circuit design process, and a frontend design process may be performed before operation S310. The frontend design process may include, for example, determination of a design specification, modeling and verification of an act level, designing of an RTL, verification of a function, synthesis of logic, and verification of a gate level (or simulation of a pre-layout).

In operation S410, a mask is generated based on a layout. For example, first, an optical proximity correction (OPC) may be performed based on the layout. The OPC refers to a process of changing a layout while reflecting an error according to an optical proximity effect. Subsequently, the mask may be manufactured according to the layout changed based on the OPC performance result. Then, the mask may be manufactured using a layout reflecting the OPC such as, for example, a GDS on which the OPC is reflected.

In operation S430, an integrated circuit is manufactured using the mask. For example, a semiconductor device in which an integrated circuit is implemented is formed by performing various semiconductor processes on a semiconductor substrate, such as a wafer, using the mask. The process using the mask may refer to, for example, a patterning process through a lithographic process. A desired pattern may be formed on a semiconductor substrate or a material layer through the patterning process. The semiconductor process may include, for example, a deposition process, an etching process, an ionizing process, and a cleaning process. The semiconductor process may further include, for example, a packaging process including mounting a semiconductor device on a printed circuit board (PCB) and sealing the semiconductor with a sealant. The semiconductor process may further include, for example, a test process of testing a semiconductor device or a package.

Figure 20:
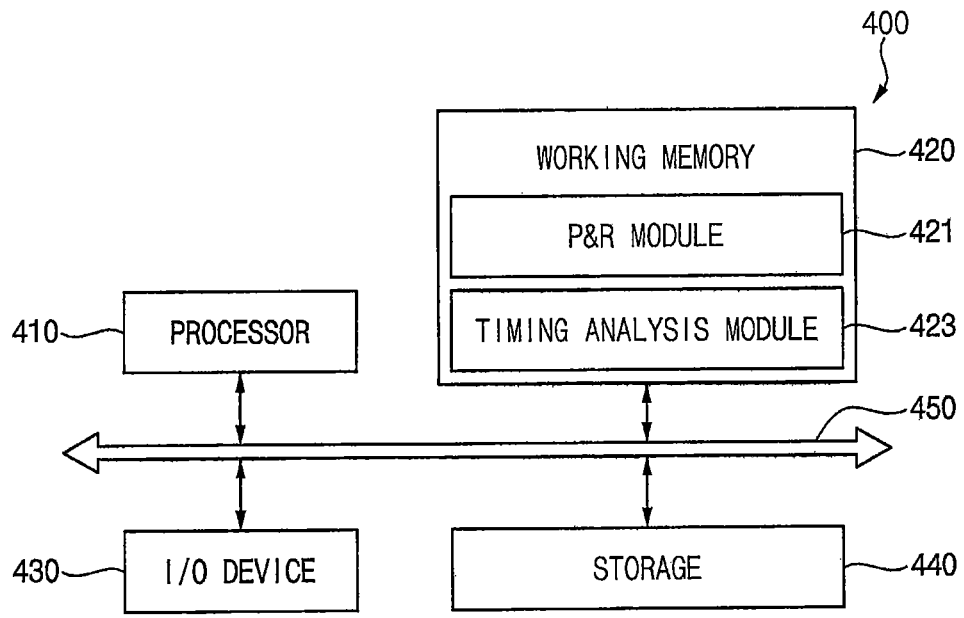
FIG. 20 illustrates an integrated circuit design system according to example embodiments of the present disclosure.

FIG. 20 illustrates an integrated circuit design system according to example embodiments of the present disclosure.

Referring to FIG. 20, an integrated circuit design system 400 may include a processor 410, a working memory 420, an input/output (I/O) device 430 an auxiliary storage 440, and a bus 450. The integrated circuit design system 400 may perform the integrated circuit design process S300 in FIG. 19. The integrated circuit design system 400 may be implemented by an integrated device, and accordingly, may be referred to as an integrated circuit design apparatus. The integrated circuit design system 400 may be provided as a dedicated apparatus for designing an integrated circuit of a semiconductor device, and may be a computer for driving various simulation tools or design tools.

The processor 410 may be configured to execute instructions performing at least one of various operations for designing an integrated circuit. The processor 410 may perform communication with the working memory 420, the I/O device 430, and the auxiliary storage 440 through the bus 450. The processor 410 may execute an operation of designing the integrated circuit by driving a placement and routing (P&R) module 421 and a timing analysis module 423 loaded in the working memory 420. For example, the processor 410 may execute an operation of designing the integrated circuit by executing instructions stored in the memory relating to P&R and timing analysis.

The working memory 420 may store the P&R module 421 (e.g., instructions relating to P&R) and the timing analysis module 423 (e.g., instructions relating to timing analysis). The P&R module 421 and the timing analysis module 423 may be loaded from the auxiliary storage 440 to the working memory 420. The working memory 420 may be a volatile memory such as, for example, static random access memory (SRAM) or dynamic random access memory (DRAM), or may be a nonvolatile memory such as, for example, PRAM, MRAM, ReRAM, or a NOR flash memory.

The P&R module 421 may be, for example, a program including instructions for performing an arrangement operation according to operation S310 in FIG. 19, and a wiring operation according to operations S330 in FIG. 19. The timing analysis module 423 may be, for example, a program including instructions for determining whether timing constraints are satisfied. Determining whether timing constraints are satisfied may include, for example, performing a timing analysis on all timing paths in the arranged standard cells. The timing analysis module 423 may refer to, for example, a static timing analysis (STA) tool.

The I/O device 430 may control user inputs from user interface devices, and outputs. The I/O device 430 may include an input device such as, for example, a keyboard, a mouse, or a touchpad, and may receive input data defining an integrated circuit. The I/O device 430 may include an output device such as, for example, a display or a speaker, and may display, for example, an arrangement result, a wiring result, or a timing analysis result.

The auxiliary storage 440 may store various data related to the P&R module 421 and the timing analysis module 423. The auxiliary storage 440 may include, for example, a memory card (e.g., an MMC, an eMMC, an SD, a microSD, etc.), a solid state drive, and/or a hard disk drive.

Figure 21:
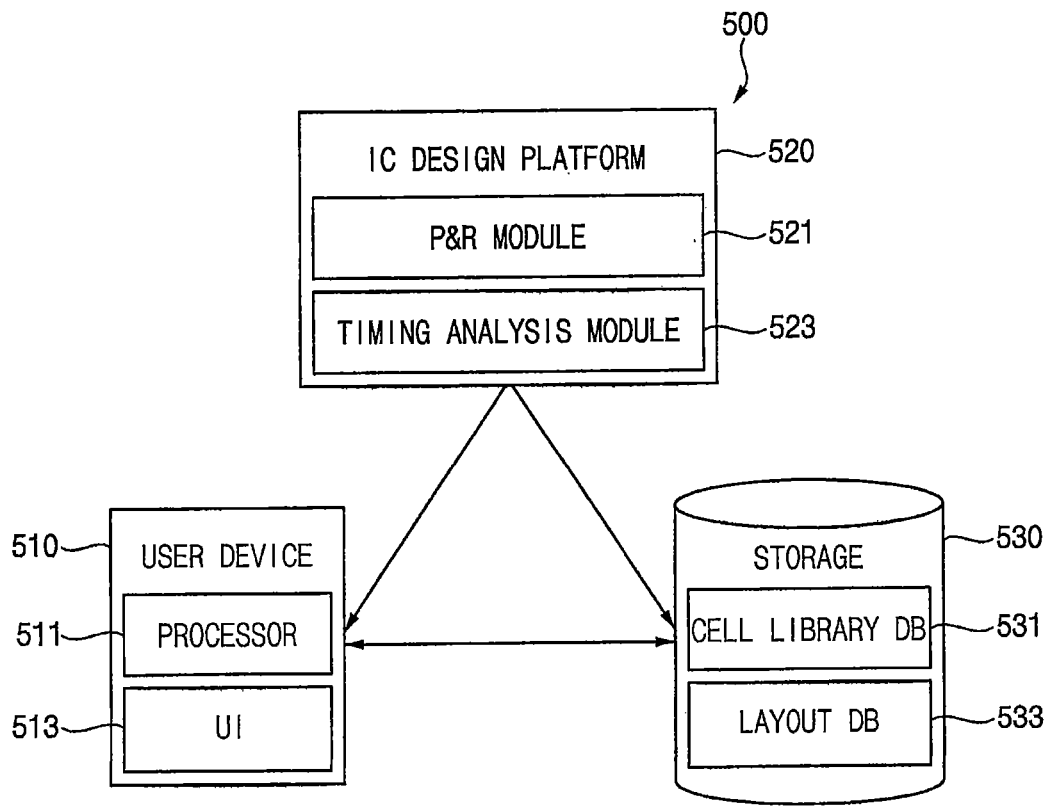
FIG. 21 illustrates an integrated circuit design system according to example embodiments of the present disclosure.

FIG. 21 illustrates an integrated circuit design system according to example embodiments of the present disclosure.

Referring to FIG. 21, an integrated circuit design system 500 may include a user device 510, an integrated circuit design platform 520, and an auxiliary storage 530. The integrated circuit design system 20 may perform the integrated circuit design operation S300 in FIG. 19.

The user device 510 may include a processor 511 and a user interface (UI) 513. The processor 511 may drive the integrated circuit design platform 520 according to a user input through the UI 513. The integrated circuit design platform 520 is a set of computer-readable instructions for designing an integrated circuit, and may include a P&R module 521 (e.g., corresponding to instructions relating to P&R) and a timing analysis module 523 (e.g., corresponding to instructions relating to timing analysis). The auxiliary storage 530 may include a cell library database (DB) 531 and a layout DB 533. The cell library DB 531 stores information relating to cells used for generating a layout of an integrated circuit, and the layout DB 533 stores information relating to a layout generated by the P&R module 521 (e.g., physical information of the layout).

Figure 22:
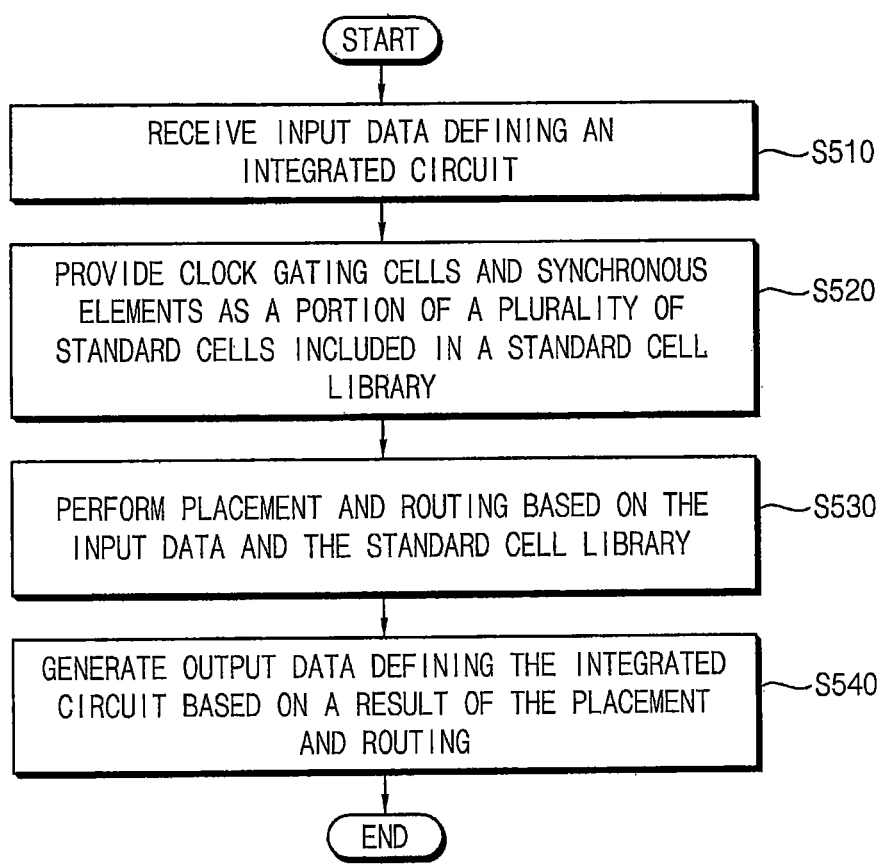
FIG. 22 is a flow chart illustrating a method of designing an integrated circuit according to example embodiments of the present disclosure.

FIG. 22 is a flow chart illustrating a method of designing an integrated circuit according to example embodiments of the present disclosure.

Referring to FIG. 22, input data defining the integrated circuit may be received (S510). Clock gating cells and synchronous elements are provided as a portion of a plurality of standard cells included in a cell library (S520).

Placement and routing are performed based on the input data and the standard cell library (S530) and output data defining the integrated circuit are provided based on a result of the placement and the routing (S540). The operation (S530) may include operations S100, S200, S110, S200a and S200b in FIGS. 1 through 4.

Figure 23:
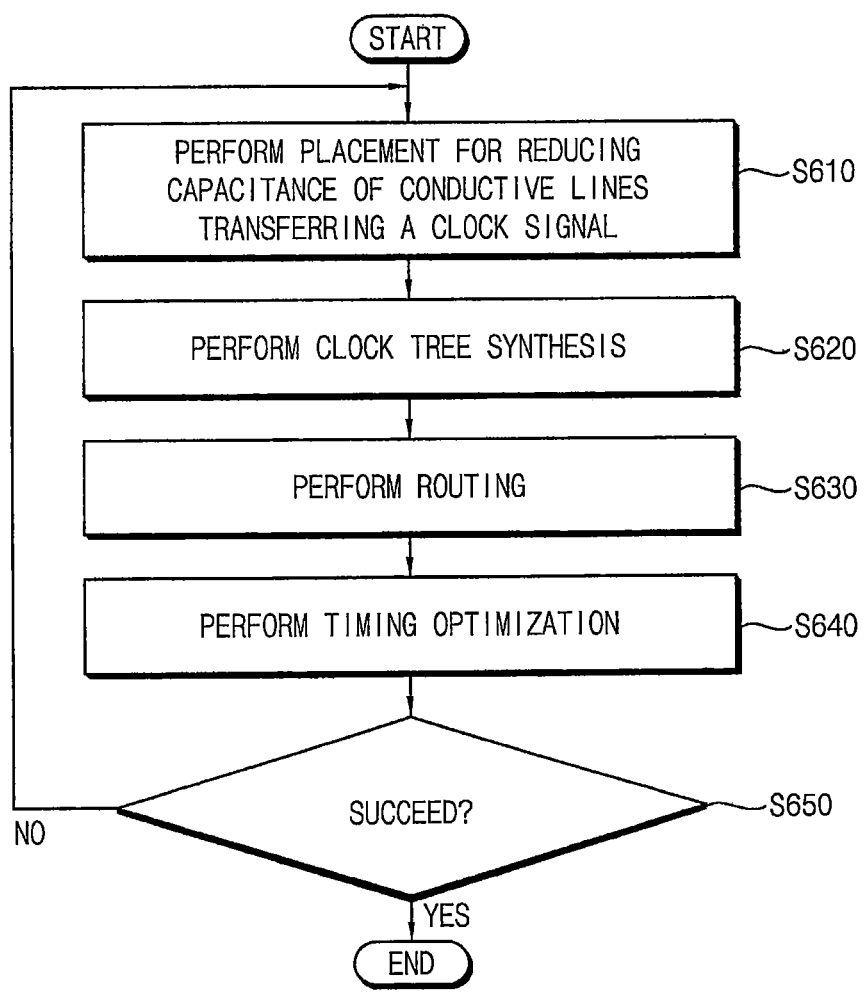
FIG. 23 is a flowchart illustrating an example of performing placement and routing in the method of FIG. 22.

FIG. 23 is a flowchart illustrating an example of performing placement and routing in FIG. 22.

Referring to FIG. 23, when performing the placement and routing, placement for reducing capacitance of conductive lines transferring a clock signal is performed (operation S610), and clock tree synthesis (CTS) is performed (operation S620). Signal routing with respect to the placed cells is performed (operation S630), and timing optimization is performed (operation S640).

The timing analysis module 423 in FIG. 20 may check whether the placement and routing have been successfully completed (operation S650). When the placement and routing are not successful (NO in S650), e.g., when at least one of the signal routing and the timing optimization are not successful, operations S610, S620, S630 and S640 may be repeated or recursively performed. In other words, the above described processes of FIG. 23 may be repeated until the placement and routing are successfully completed.

When the placement and routing are successful (YES in S650), the process may end.

As described above, the method of routing a clock tree, the integrated circuit, and the method of designing the integrated circuit according to example embodiments may reduce power consumption due to capacitance by determining a level of each of the plurality of clock nets based on a number of clock gating cells that each of the plurality of clock nets passes through until each of the plurality of clock nets receives the clock signal from the clock source and by increasing a routing space of conductive lines in a corresponding clock net as the level of the clock net decreases.

Example embodiments may be applied to any electronic devices and systems. For example, embodiments may be applied to systems such as be a memory card, a solid state drive (SSD), an embedded multimedia card (eMMC), a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

The foregoing is illustrative of example embodiments and is not to be construed as limiting thereof. Although a few example embodiments have been described, those skilled in the art will readily appreciate that many modifications are possible in the example embodiments without materially departing from the present inventive concept.

What is claimed is:

1. A method of routing a clock tree comprising a plurality of clock nets of an integrated circuit, wherein each of the plurality of clock nets comprises at least one clock repeater, the method comprising:

determining a level of a clock net of the plurality of clock nets, wherein the level of the clock net of the plurality of clock nets corresponds to a number of clock gating cells that a clock signal passes through until the clock net receives the clock signal from a clock source, wherein each of the plurality of clock nets is configured to transfer the clock signal to a plurality of synchronous elements or another clock net, and wherein the plurality of synchronous elements operate in synchronization with the clock signal and are included in the integrated circuit; and routing a plurality of conductive lines in each of the plurality of clock nets by applying different routing rules to clock nets having different levels from among the plurality of clock nets based on the determined level.

2. The method of claim 1, wherein determining the level of each of the plurality of clock nets comprises increasing the level as the number of the clock gating cells through which the clock signal passes increases.

3. The method of claim 2, wherein routing the conductive lines comprises increasing a routing space between adjacent conductive lines from among the plurality of conductive lines as the level decreases.

4. The method of claim 3, wherein the plurality of clock nets comprise a first clock net having a first level and a second clock net having a second level, and
wherein a coupling capacitance between conductive lines in the first clock net is smaller than a coupling capacitance between conductive lines in the second clock net.

5. The method of claim 3, wherein routing the conductive lines comprises increasing a width of each of the conductive lines as the level decreases.

6. The method of claim 2, wherein the plurality of conductive lines are provided by using a plurality of metal layers which are sequentially stacked in a vertical direction from a substrate on which the integrated circuit is provided, and
wherein the plurality of metal layers have degrees that increase based on a stacked order of the metal layer.

7. The method of claim 6, wherein routing the conductive lines comprises increasing a routing space between adjacent conductive lines from among the plurality of conductive lines as the level decreases.

8. The method of claim 6, wherein routing the conductive lines comprises:
increasing a routing space between adjacent conductive lines from among the plurality of conductive lines as the level decreases; and
for at least one clock net of the plurality of clock nets, increasing the routing space in the clock net as the degree of a metal layer of the plurality of metal layers corresponding to the clock net increases.

9. The method of claim 1, wherein routing the plurality of conductive lines in each of the plurality of clock nets further comprises applying different routing rules based on a height of a metal layer used to implement the clock net from a substrate.

10. The method of claim 1, wherein the at least one clock repeater comprises a buffer and/or an inverter.

11. The method of claim 1, wherein each of the plurality of synchronous elements comprises a flip-flop and a latch.

12. The method of claim 1, wherein each of the clock gating cells is configured to be enabled in response to a corresponding enable signal, and is configured to transfer the clock signal received from a first clock net of the plurality of clock nets having a first level to a second clock net of the plurality of clock nets having a second level, greater than the first level.

13. The method of claim 1, wherein the conductive lines of clock nets of the plurality of clock nets having a same level have a same switching activity, and
wherein the switching activity corresponds to a number of toggles of the clock signal per a reference time interval.

14. An integrated circuit comprising:
a clock tree, wherein the clock tree includes:
a clock source;
a plurality of synchronous elements operating in synchronization with a clock signal provided by the clock source; and
a plurality of clock nets between the clock source and the plurality of synchronous elements; and
a plurality of clock gating cells between the plurality of clock nets,
wherein a plurality of conductive lines in each of the plurality of clock nets are routed by applying different routing rules to ones of the plurality of clock nets based on a level of each of the plurality of clock nets, and
wherein the level of a clock net of the plurality of clock nets corresponds to a number of the plurality of clock gating cells that the clock signal passes through until the clock net receives the clock signal from the clock source, wherein each of the plurality of clock nets is configured to transfer the clock signal to the plurality of synchronous elements or another clock net.

15. The integrated circuit of claim 14, wherein:
the level of each of the plurality of clock nets is increased as the number of the clock gating cells through which the clock signal passes to the clock net increases; and
a routing gap between adjacent conductive lines from among the plurality of conductive lines is increased as the level decreases.

16. The integrated circuit of claim 15, wherein a width of each of the conductive lines is increased as the level decreases.

17. The integrated circuit of claim 15, wherein the plurality of conductive lines comprise a plurality of metal layers that are sequentially stacked in a vertical direction from a substrate in which the integrated circuit is provided, and
wherein each of the plurality of metal layers comprises a degree that increases based on a stacked order of the metal layer.

18. The integrated circuit of claim 17, wherein:
a routing gap between adjacent conductive lines from among the plurality of conductive lines is increased as the level decreases; and
the routing gap in clock nets having a same level from among the plurality of clock nets is increased as the degree of a metal layer of the plurality of metal layers corresponding to the clock net increases.

19. The integrated circuit of claim 14, wherein at least one of the plurality of synchronous element includes:
a semiconductor substrate;
a first power rail, a second power rail, and a third power rail above the semiconductor substrate, extending in a first direction and arranged sequentially in a second direction that is perpendicular to the first direction; and
a flip-flop comprising a first master latch and a first slave latch in a first region between the first power rail and the second power rail, the first master latch comprising a first tri-state inverter and a second tri-state inverter, the first slave latch comprising a third tri-state inverter and a fourth tri-state inverter.

20. A method of designing an integrated circuit, comprising:
receiving input data defining an integrated circuit;
providing a plurality of clock gating cells and a plurality of synchronous elements as a portion of a plurality of standard cells in a standard cell library;
performing placement and routing based on the input data and the standard cell library; and generating output data defining the integrated circuit based on a result of the placement and the routing, wherein performing placement and routing includes:

determining a level of each clock net of a plurality of clock nets corresponding to a number of clock gating cells through which a clock signal passes to reach the clock net from a clock source, the plurality of synchronous elements operating in synchronization with the clock signal and being included in the integrated circuit; and routing a plurality of conductive lines in each of the plurality of clock nets by applying different routing rules to clock nets having different levels based on the determined level.

* * * * *